(12) United States Patent
Khera et al.

(10) Patent No.: US 11,489,757 B2
(45) Date of Patent: Nov. 1, 2022

(54) SHORTEST PATH BRIDGING (SPB) MULTI AREA

(71) Applicant: Extreme Networks, Inc., San Jose, CA (US)

(72) Inventors: Gautam Khera, Sugarland, TX (US); Constantin Barcaru, Bucharest (RO)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 17/360,041

(22) Filed: Jun. 28, 2021

(65) Prior Publication Data

US 2022/0255843 A1 Aug. 11, 2022

Related U.S. Application Data

(63) Continuation of application No. 17/168,900, filed on Feb. 5, 2021.

(51) Int. Cl.
*H04L 45/122* (2022.01)
*H04L 45/12* (2022.01)
*H04L 45/42* (2022.01)

(52) U.S. Cl.
CPC .......... *H04L 45/122* (2013.01); *H04L 45/123* (2013.01); *H04L 45/42* (2013.01)

(58) Field of Classification Search
CPC ...... H04L 45/122; H04L 45/123; H04L 45/42
USPC ........................................................ 709/238
See application file for complete search history.

(56) References Cited

U.S. PATENT DOCUMENTS

| | | | | |
|---|---|---|---|---|
| 10,382,333 | B2 * | 8/2019 | Jeganathan | ........... H04L 45/021 |
| 2007/0214275 | A1 * | 9/2007 | Mirtorabi | ................ H04L 45/18 709/230 |
| 2013/0077628 | A1 * | 3/2013 | Appalla | .................. H04L 45/16 370/390 |
| 2013/0195111 | A1 | 8/2013 | Allan et al. | |
| 2015/0044997 | A1 | 2/2015 | Efarti et al. | |
| 2016/0337233 | A1 | 11/2016 | Lu et al. | |
| 2019/0312770 | A1 | 10/2019 | Bidgoli et al. | |

FOREIGN PATENT DOCUMENTS

EP 2549689 A2 1/2012

OTHER PUBLICATIONS

U.S. Appl. No. 17/168,900, filed Feb. 5, 2021.
U.S. Appl. No. 17/360,048, filed Jun. 28, 2021.
U.S. Appl. No. 17/360,050, filed Jun. 28, 2021.
(Continued)

*Primary Examiner* — Hermon Asres
(74) *Attorney, Agent, or Firm* — Sterne, Kessler, Goldstein & Fox P.L.L.C.

(57) ABSTRACT

Disclosed herein are system, method, and computer program product aspects for multiple instance Intermediate System to Intermediate System (IS-IS or ISIS) for a multi-area fabric. A network area in a multi-area fabric includes one or more network nodes and a boundary node shared with an other network area of the multi-area fabric outside of the network area. The boundary node can include a first ISIS instance associated with the network area and a second ISIS instance associated with the other network area. The second ISIS instance can be configured to pass information associated with the other network area to the first ISIS instance.

20 Claims, 18 Drawing Sheets

(56) References Cited

OTHER PUBLICATIONS

U.S. Appl. No. 17/168,963, filed Feb. 5, 2021.
U.S. Appl. No. 17/168,909, filed Feb. 5, 2021.
U.S. Appl. No. 17/168,954, filed Feb. 5, 2021.
International Search Report and Written Opinion of the International Searching Authority directed to related International Patent Application No. PCT/US2022/015068, dated Jun. 22, 2022; 18 pages.
Jonathan Sadler Tellabs: "Multi-Level IS-IS Without Protocol Extensions 47 draft-sadler-isis-rnl-bcp-00.txt; draft-sadler-isis-ml- bcp-00.txt", Multi-Level IS-IS Without Protocol Extensions Draft-Sadler-ISIS-ML-BCP-00.Txt; Draft-Sadler-ISIS-ML-BCP-00.Txt, Internet Engineering Task Force, IETF;' Standardworkingdraft, Internet Society (ISOC) 4, Rue Des Falaises Ch—1205 Geneva, Switzerland, Feb. 1, 2003 (Feb. 1, 2003), XP015005124.

* cited by examiner

SHORTEST PATH BRIDGING (SPB) MULTI AREA

CROSS-REFERENCE TO RELATED APPLICATIONS

This application is a continuation of U.S. patent application Ser. No. 17/168,900 filed Feb. 5, 2021, which is herein incorporated by reference in its entirety.

This application is related to U.S. patent application Ser. No. 17/168,943 titled "MAC-Based Redistribution in Multi-Area Networks," filed Feb. 5, 2021, U.S. patent application Ser. No. 17/168,909 titled "Shortest Path Bridging (SPB) Multi Area and Virtual SPB Node," filed Feb. 5, 2021, and U.S. patent application Ser. No. 17/168,954 titled "Multi-Cast Redistribution and Remap for Multi-Area Networks," filed Feb. 5, 2021, which are herein incorporated by reference in their entireties.

BACKGROUND

Field

The described aspects generally relate to multi-area fabric(s). For example, some aspects of this disclosure relate to Shortest Path Bridging (SPB) multi-area fabric(s). Some aspects of this disclosure relate to systems and methods for multiple instance Intermediate System to Intermediate System (IS-IS or ISIS) for a multi-area fabric. Some aspects of this disclosure relate to systems and methods for virtual node(s). For example, some aspects of this disclosure relate to systems and methods for generating and/or using virtual node(s) in a multi-area fabric (e.g., a multi-area SPB fabric). Some aspects of this disclosure relate to methods and systems for automatic configuration of boundary node(s) and/or virtual node(s) in a multi-area fabric (e.g., a multi-area SPB fabric). Some aspects of this disclosure relate to systems and methods for multiple boundary nodes and discovery in a Multi-area fabric (e.g., a multi-area SPB fabric). Some aspects of this disclosure relate to systems and methods for loop prevention in a multi-area fabric (e.g., a multi-area SPB fabric).

Related Art

SPB currently only allows to build a flat network in a single ISIS area. This puts a practical deployment limitation on the number of nodes that an SPB network can have. This limitation is due to issues related with growing a network size. Many nodes in the SPB network increase the Link State Database (LSDB) size. Increased LSDB size requires higher computing resources such as disc space, memory, and processing power. This increased LSDB size creates problems in terms of unreliable convergence and scaling. The large LSDB size also puts a limitation of having all nodes on the network with higher level of capability since in a link state-based protocol, all nodes in the node maintain the complete topological information. This flat network also creates a problem of experiencing network fluctuations throughout the network if there is some change in any part of the network.

SUMMARY

Some aspects of this disclosure include apparatuses and methods for implementing Shortest Path Bridging (SPB) multi-area. According to some aspects, "Multi Area SPB" realizes building a SPB network with several smaller networks in multiple areas connected hierarchically or in any other topology. In some examples, aspects of this disclosure can avoid having a single flat SPB fabric and hence, address the problems mentioned above (among other problems) and can improve the scalability of the SPB fabric. Some aspects of this disclosure can reduce deployment cost. For example, need appropriate capable nodes can be deployed in each layer/level of hierarchy or area of the SPB fabric. Additionally, network changes and upgrades can be performed with specific selected nodes with appropriate capability. Additionally, network capacity within each level of hierarchy or area can be accurately planned. For example, network node(s) and/or area(s) can be incrementally built without disturbing the whole network. With this modular network building approach, testing and design the network becomes easier. Also, since the network is segmented to smaller manageable areas, fault isolation and debugging becomes less cumbersome and managing the nodes becomes simple. Additionally, the SPB multi-area aspects of this disclosure can implement a loop free topology, can avoid database explosion, and/or can avoid network churns and massive re-computation for changes in the network.

Some aspects of this disclosure relate to systems and methods for multiple instance Intermediate System to Intermediate System (IS-IS or ISIS) for a multi-area fabric. A network area in a multi-area fabric includes one or more network nodes and a boundary node shared with an other network area of the multi-area fabric outside of the network area. The boundary node can include a first Intermediate System to Intermediate System (ISIS) instance associated with the network area and a second ISIS instance associated with the other network area. The second ISIS instance can be configured to pass information associated with the other network area to the first ISIS instance.

In some aspects, the network area further includes a first local Link State Protocol Data Units (PDU) (LSP) and a first remote LSP in a first Link State Database (LSDB), and the other network area includes a second local LSP and a second remote LSP in a second LSDB.

In some aspects, the first ISIS instance includes information associated with the first local LSP and the first remote LSP, and the second ISIS instance includes information associated with the second local LSP and the second remote LSP.

In some aspects, the boundary node is configured to create the first and second ISIS instances by copying a first ISIS code associated with the network area under a first directory, copying a second ISIS code associated with the other network area under a second directory, renaming one or more functions associated with the first ISIS code, renaming one or more functions associated with the second ISIS code, renaming one or more variables associated with the first ISIS code, renaming one or more variables associated with the second ISIS code, and initializing the first and second ISIS instances.

In some aspects, the boundary node is configured to create the first and second ISIS instances by generating a first pointer associated with the first ISIS instance, generating a second pointer associated with the second ISIS instance, moving a first set of one or more non-global variables associated with the first ISIS instance to the first pointer, moving a second set of one or more non-global variables associated with the second ISIS instance to the second pointer, and initializing the first and second ISIS instances.

In some aspects, the multi-area fabric includes a Shortest Path Bridging (SPB) multi-area fabric, the network area includes a first SPB fabric, and the other network area includes a second SPB fabric.

In some aspects, the boundary node is shared with a third network area of the multi-area fabric outside of the network area and the other network area, and the boundary node includes a third ISIS instance associated with the third network area.

Some aspects of this disclosure relate to a method for operating a boundary node in a network area in a multi-area fabric. The method includes storing a first Intermediate System to Intermediate System (ISIS) instance associated with the network area, where the network area includes one or more network nodes. The method further includes storing a second ISIS instance associated with an other network area of the multi-area fabric outside of the network area, where the boundary node is shared with the other network area. The second ISIS instance is configured to pass information associated with the other network area to the first ISIS instance.

In some aspects, the method further includes generating the first and second ISIS instances. In some aspects, generating the first and second ISIS instances includes copying a first ISIS code associated with the network area under a first directory, copying a second ISIS code associated with the other network area under a second directory, renaming one or more functions associated with the first ISIS code, and renaming one or more functions associated with the second ISIS code. In some aspects, generating the first and second ISIS instances further includes renaming one or more variables associated with the first ISIS code, renaming one or more variables associated with the second ISIS code, and initializing the first and second ISIS instances.

In some aspects, generating the first and second ISIS instances includes generating a first pointer associated with the first ISIS instance and generating a second pointer associated with the second ISIS instance. In some aspects, generating the first and second ISIS instances further includes moving a first set of one or more non-global variables associated with the first ISIS instance to the first pointer, moving a second set of one or more non-global variables associated with the second ISIS instance to the second pointer, and initializing the first and second ISIS instances.

In some aspects, the first ISIS instance includes information associated with a first LSP and a first remote LSP in a first LSDB associated with the network area and the second ISIS instance includes information associated with a second local LSP and a second remote LSP in a second LSDB associated with the other network area.

In some aspects, the method further includes storing a third ISIS instance associated with a third network area of the multi-area fabric outside of the network area, where the boundary node is shared with the third network area.

Some aspects of this disclosure relate to a non-transitory computer-readable device having instructions stored thereon. When the instructions are executed by a boundary node in a network area in a multi-area fabric, the instructions cause the boundary node to perform operations. The operations include storing a first Intermediate System to Intermediate System (ISIS) instance associated with the network area, where the network area includes one or more network nodes. The operations further include storing a second ISIS instance associated with an other network area, where the boundary node is shared with the other network area of the multi-area fabric outside of the network area. The second ISIS instance is configured to pass information associated with the other network area to the first ISIS instance.

Some aspects of this disclosure are directed to systems and methods for generating and/or using virtual node(s) (e.g., virtual SPB node(s)) in a multi-area fabric (e.g., a multi-area SPB fabric). A multi-area network includes a first network area including a first set of network nodes. The multi-area network further includes a second network area including a second set of network nodes, where the second set of network nodes is outside of the first network area. The multi-area network further includes a virtual node including a logical Intermediate System to Intermediate System (ISIS) node representing at least one of the first set of network nodes and the second set of network nodes.

In some aspects, the virtual node represents the second set of network nodes of the second network area in the first network area. In some aspects, the multi-area network further includes a second virtual node representing the first set of network nodes of the first network area in the second network area In some aspects, the multi-area network further includes a third network area including a third set of network nodes. The third set of network nodes is outside of the first network area and the second network area and the virtual node further represents the third set of network nodes of the third network area in the first network area.

In some aspects, the multi-area network further includes one or more boundary nodes configured to generate the virtual node, where the one or more boundary nodes are shared between the first network area and the second network area.

In some aspects, the virtual node represents one or more services associated with the at least one of the first set of network nodes and the second set of network nodes. In some aspects, at least one of the first network area and the second network area includes a SPB fabric.

Some aspects of this disclosure relate to a multi-area network. The multi-area network includes a first network area including a first set of network nodes. The multi-area network further includes a second network area including a second set of network nodes, where the second set of network nodes is outside of the first network area. The multi-area network further includes a third network area including a third set of network nodes, where the third set of network nodes is outside of the first network area and the second network area. The multi-area network also includes a virtual node configured to represent the second set of network nodes of the second network area in the first network area and to represent the third set of network nodes of the third network area in the first network area.

In some aspects, the virtual node includes a logical Intermediate System to Intermediate System (ISIS) node. In some aspects, the multi-area network further includes a second virtual node representing the first set of network nodes of the first network area in the second network area.

In some aspects, the virtual node represents one or more services associated with the second set of network nodes. In some aspects, the virtual node represents one or more services associated with the third set of network nodes.

In some aspects, at least one of the first network area, the second network area, and the third network area includes a Shortest Path Bridging (SPB) fabric. In some aspects, the virtual node is configured to connect a first Shortest Path associated with the first network area with a second Shortest Path associated with the second network area.

In some aspects, the multi-area network further includes one or more boundary nodes configured to generate the virtual node, where the one or more boundary nodes are shared between the first network area and the second network area. In some aspects, the multi-area network further includes a second virtual node representing the third set of network nodes of the third network area in the first network area.

Some aspects of this disclosure are directed to methods and systems for automatic configuration of boundary node(s) and/or virtual node(s) in a multi-area fabric (e.g., a multi-area SPB fabric). According to some aspects, a method includes determining, by a network node, a first area identifier (ID) associated with a first area and a second area ID associated with a second area. The method further includes using, by the network node, the first area ID and the second area ID to configure the network node as a boundary node. The method also includes generating, by the network node, a virtual node including a logical Intermediate System to Intermediate System (ISIS) node and configuring, by the network node, the virtual node based at least on one or more of the first area ID and the second area ID.

In some aspects, configuring the virtual node includes determining, by the network node, a nick-name for the virtual node based at least on the one or more of the first area ID and the second area ID and determining, by the network node, a system ID for the virtual node based at least on the nick-name.

In some aspects, determining the nick-name for the virtual node includes determining the nick-name based on the first area ID of the first area that is represented by the virtual node. In some aspects, determining the nick-name for the virtual node includes determining the nick-name for the virtual node based on a plurality of least significant bits of the first area ID.

In some aspects, the first area ID includes a first ISIS area ID, the second area ID includes a second ISIS area ID, and the system ID includes an ISIS system ID.

In some aspects, determining the first area ID and the second area ID includes deriving the first area ID from a first Type-Length-Value (TLV) from the first area and deriving the second area ID from a second TLV from the second area.

In some aspects, the first and second areas are within a multi-area fabric, the configuring the network node as the boundary node includes configuring the network node as the boundary node in a SPB fabric, and the boundary node is shared between the first and second areas of the multi-area fabric.

Some aspects of this disclosure relate to systems and methods for multiple SPB boundary nodes and discovery. Some aspects relate to a method including receiving, by a first network node of a multi-area fabric, a packet from a second network node and examining, by the first network node, a Type-Length-Value (TLV) in the packet. The method further includes determining, by the first network node, that the TLV includes a first area identifier (ID) and a second area ID. The method further includes determining, by the first network node and based at least on the determining that the TLV includes the first and second IDs, that the second network node is a boundary node shared by a first area of the multi-area fabric and a second area of the multi-area fabric.

In some aspects, the first area ID is associated with the first area of the multi-area fabric and the second area ID is associated with the second area of the multi-area fabric.

In some aspects, the method further includes determining, by the first network node, a first system ID associated with the first network node and determining, by the first network node, a second system ID associated with the second network node.

In some aspects, the method further includes comparing, by the first network node, the first system ID with the second system and determining, by the first network node and based at least on the comparison, that the second network node is a designated boundary node configured to generate a virtual node.

In some aspects, the method further includes determining, by the first network node and based at least on the comparison, that the first network node is a backup boundary node configured to represent the virtual node in response to the designated boundary node failing.

In some aspects, determining that the second network node is the designated boundary node includes determining, by the first network node, that the second system ID associated with the second network node has a lower value than the first system ID associated with the first network node.

In some aspects, the first network node is an other boundary node shared by the first area of the multi-area fabric and the second area of the multi-area fabric, and the packet includes an LSP.

Some aspects of this disclosure relate to a non-transitory computer-readable device having instructions stored thereon. When the instructions are executed by a first network node of a multi-area fabric, the instructions cause the first network node to perform operations. The operations include receiving a packet from a second network node and examining a Type-Length-Value (TLV) in the packet. The operations further include determining that the TLV includes a first area identifier (ID) associated with a first area of the multi-area fabric and a second area ID associated with a second area of the multi-area fabric. The operations also include determining, based at least on the determining that the TLV includes the first and second IDs, that the second network node is a boundary node shared by the first area of the multi-area fabric and the second area of the multi-area fabric.

In some aspects, the operations further include determining that the second network node is a designated boundary node configured to generate a virtual node by determining that a second system ID associated with the second network node has a lower value than a first system ID associated with the first network node. In some aspects, the first network node is another boundary node shared by the first area of the multi-area fabric and the second area of the multi-area fabric, and the packet includes an LSP.

Some aspects of this disclosure relate to systems and methods for loop prevention in a multi-area fabric (e.g., a multi-area SPB fabric). For example, some aspects relate to a method including receiving, by a network node, a request to connect a first area of a multi-area fabric to a second area of the multi-area fabric. The method further includes examining, by the network node, a topological Type-Length-Value (TLV) associated with a virtual node of the first area and determining, by the network node and based at least on the examining the topological TLV, whether the first area and the second area are connected. The method also includes, in response to determining that the first area and the second area are connected, preventing, by the network node, a loop between the first area and the second area.

In some aspects, the method further includes examining, by the network node, an other topological TLV associated with an other virtual node of the second area and determining, by the network node and based at least on the examining the topological TLV and the other topological TLV, whether the first area and the second area are connected.

In some aspects, the preventing the loop between the first area and the second area includes preventing the network node from generating a second virtual node.

In some aspects, receiving the request to connect the first area and the second area includes detecting, by the network node, one or more conditions to configure the network node as a boundary node.

In some aspects, the topological TLV associated with the virtual node of the first area includes an area identifier (ID) of a third area, and the virtual node is configured to represent the third area in the first area. In some aspects, the topological TLV associated with the virtual node of the first area further includes a neighbor area ID of a fourth area that is a neighbor of the third area.

In some aspects, determining whether the first area and the second area are connected includes determining that the first area is connected to the third area, determining that the third area is connected to the fourth area, and determining that the fourth area is connected to the second area. In some aspects, the first area is connected to the third area by sharing a boundary node.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings are incorporated herein and form a part of the specification.

Figure 1A:
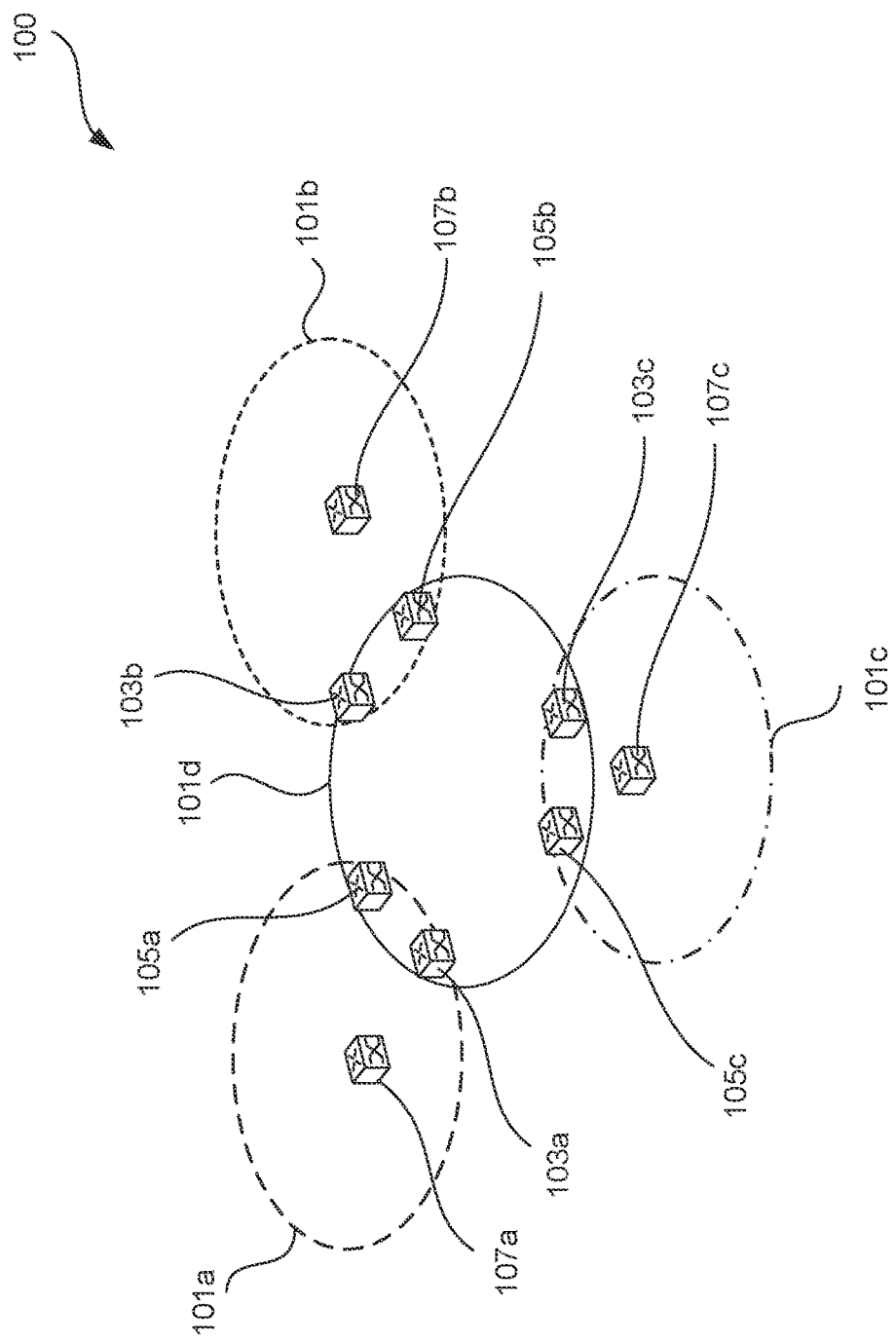
FIGS. 1A-1E illustrate exemplary multi-area Shortest Path Bridging (SPB) topologies, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing functionality for implementing SPB multi-area fabric.

An ISIS protocol has the provision to define multiple areas, which can be joined together in a strict hierarchical topology. The area defined by the ISIS protocol is either defined as Level 1 (L1) or Level 2 (L2). Traffic between L1 areas must traverse the L2 area. In other words, any communication between a node of a first L1 area and the node of a second L1 area has to traverse the L2 area. L2 area is, therefore, the backbone area that connects all L1 areas. With two levels, only two layers of hierarchy is possible. This ISIS protocol is limited to two levels and puts constraints on the topology of networks and how the networks can be connected. Even if some variations of the ISIS protocol can define additional levels to increase the level of hierarchy, these variations still suffer from the restriction of having to construct the network in a strict hierarchy and having traffic between nodes in different areas at the same level to move up the level and down again.

In contrast to the ISIS protocol discussed above, some aspects of this disclosure are directed to architectures and methods to combine multiple domains (e.g., SPB domains) without the restriction of going through a particular domain (e.g., a particular SPB domain). For example, some aspects of this disclosure use multiple instances on a node to achieve an ISIS hierarchy or any flexible topology, without the need to have a backbone. In turn, these aspects of the disclosure provide optimal flexibility to construct the network.

Some aspects of this disclosure are directed to a SPB fabric (and methods of creating the SPB fabric) with multiple smaller SPB fabrics. In some examples, each one of the multiple smaller SPB fabrics can include its own network area (e.g., ISIS area) and can use multiple ISIS instances. According to some aspects, a multi-area SPB fabric/network is a SPB network with smaller networks in multiple areas connected hierarchically or in any loop free flexible topology. As mentioned above, the multi-area SPB can avoid having a single flat SPB fabric, which has limited scalability due to computing, memory, and performance constraints.

In the multi-area SPB architecture, a boundary node can interconnect with multiple ISIS areas. In some examples, each ISIS area has its own local and remote Link State Protocol Data Units (PDUs) (LSPs) in the LSDB and Network-to-Network Interface (NNI) (although, a physical port might support logical NNI interface for both the ISIS areas). To keep information about each ISIS area separate, a separate ISIS instance can be created that passes information between ISIS areas. In some examples, each ISIS instance includes information associated with its corresponding local LSP and remote LSP. Additionally, or alternatively, the ISIS instances in the boundary node can communicate with (e.g., pass to) each other information associated with their corresponding ISIS area.

FIGS. 1A-1E illustrate exemplary multi-area SPB topologies, according to some aspects of the disclosure. As illustrated in FIGS. 1A-1E, a SPB network is segmented into multiple areas and these areas are connected hierarchically or in any loop free flexible topology. Each area in the multi-area SPB fabric can be self-contained such that network changes in one area is not visible in other areas. FIGS. 1A-1E illustrate some exemplary methods for connecting multiple areas in the multi-area SPB fabric. However, the aspects of this disclosure are not limited to these examples, and the multi-area SPB fabric of this disclosure can include other topologies.

According to some aspects, an area of the multi-area SPB fabric can include one or more boundary nodes. In some examples, an area of the multi-area SPB fabric can include only one or more boundary nodes (e.g., no interior nodes). In some examples, an area of the multi-area SPB fabric can include one or more interior nodes and one or more boundary nodes. In some examples, a boundary node can have the functionalities of an interior node. In some examples, a boundary node can connect two or more areas in the multi-area SPB fabric, and can run two or more separate ISIS instances (and/or SPB instances), one for each area the boundary node is part of. Although some aspects of this disclosure are discussed with respect to boundary nodes that connect two areas, the aspects of this disclosure are not limited to two areas and the boundary nodes can connect any number of areas and can run ISIS instances (and/or SPB instances) for each area that they are part of.

FIG. 1A illustrates one example Hub-and-Spoke Topology 100 for the multi-area SPB fabric, according to some aspects of the disclosure. In some examples, Hub-and-Spoke topology 100 can include areas 101a, 101b, 101c, and 101d. In this exemplary Hub-and-Spoke topology 100, areas 101a, 101b, and 101c can be connected through area 101d, which can be considered as the hub area. While area 101d has a hub role from the network design point of view, as far as the multi-area SPB fabric goes, area 101d is similar to areas 101a-c. This is also an example of a hierarchical topology, where area 101d is the backbone area (for example L2 area in traditional ISIS network) at one level connecting the other areas (for example L1 area in traditional ISIS network), which are in a different level.

FIG. 1A illustrates that areas 101a-c are spoke areas and area 101d is a hub area. In this example, two boundary nodes are illustrated that connect two areas. For example, boundary nodes 103a and 105a connect areas 101a and 101d; boundary nodes 103b and 105b connect areas 101b and 101d; and boundary nodes 103c and 105c connect areas 101c and 101d. Although two boundary nodes are illustrated connecting two areas, any number of boundary nodes can be used to connect two or more areas. Also, different areas can have different number of boundary nodes. Additionally, although boundary nodes are shown to connect two areas, the boundary nodes can connect two or more areas.

According to some aspects, boundary nodes of each area have connectivity to the adjacent area. For example, boundary nodes 103a and 105a can have connectivity to areas 101a and 101d. In some examples, these boundary nodes 103a-c and 105a-c need not be physically connected, but they have reachability to each other in both areas (instances) they are a part of.

According to some examples, each area can include one or more interior nodes (non-boundary nodes). For example, area 101a can include interior node 107a, area 101b can include interior node 107b, and area 101c can include interior node 107c. In some examples, interior nodes (non-boundary nodes) from an area (home area) are not connected to other nodes of other area (out-of-area). For example, interior node 107a of area 101a is not connected to interior node 107c of area 101c. However, in some examples, all areas 101a-c can reach other areas through the hub area 101d. Although one interior node is illustrated in FIG. 1A for each area, areas 101a-d can include any number of interior nodes. It is noted that references to home area, out-of-area, and remote area are not limiting on the aspects of this disclosure and can provide a point of view for a network area. For example, for the network area, its area can be considered the home area and the other network area(s) can be considered remote area(s) or out-of-area(s). According to some aspects of this disclosure, each network area can directly connect to one or more other network areas.

According to some examples, a node (such as the interior node or the boundary node) as discussed in this disclosure can include a fabric node and/or a network node such as, but not limited to, a connection point inside and/or at the boundary of a network that can receive, transmit, create, and/or store data and/or other information. Some non-limiting examples of a node can include computers, routers, gateways, modems, printers, scanners, TVs, smart phones, Internet of Things (IoT) devices, bridges, switches, and the like.

Figure 1B:
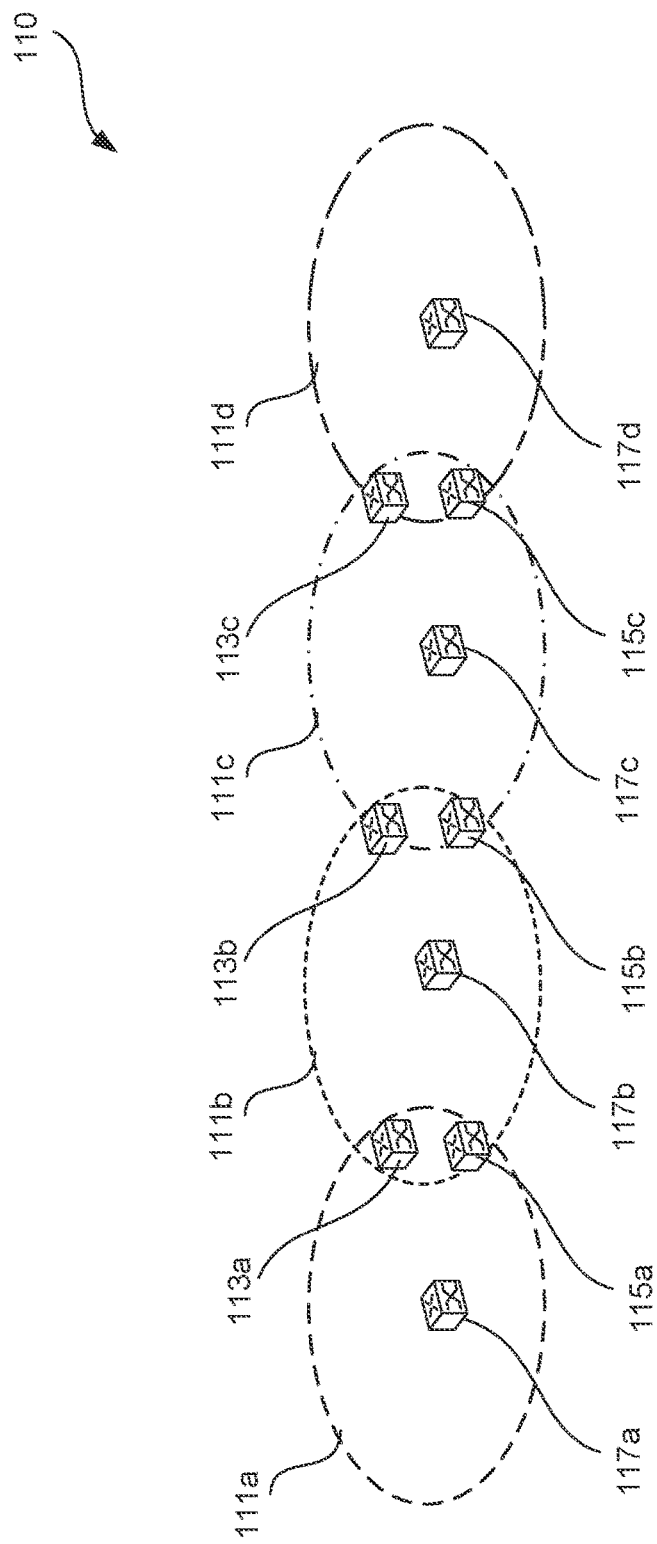

FIG. 1B illustrates one example Daisy Chain Topology 110 for the multi-area SPB fabric, according to some aspects of the disclosure. In some examples, Daisy Chain Topology 110 can include areas 111a, 111b, 111c, and 111d. In this exemplary Daisy Chain Topology 110, multiple areas 111a-d can be connected as a daisy chain through their boundary nodes with each area resembling a link of the daisy chain. In this example, there is no single hub that connects all the area. In this example, Daisy Chain Topology 110 can include interior nodes 117a-d in areas 111a-d, respectively. Also, Daisy Chain Topology 110 can include boundary nodes 113a-113c and boundary nodes 115a-115c. Although two boundary nodes are illustrated connecting two areas, any number of boundary nodes can be used to connect two or more areas. Also, different areas can have different number of boundary nodes. Additionally, although boundary nodes are shown to connect two areas, the boundary nodes can connect two or more areas. Also, each area can include any number of interior nodes similar to or different from other areas.

Figure 1C:
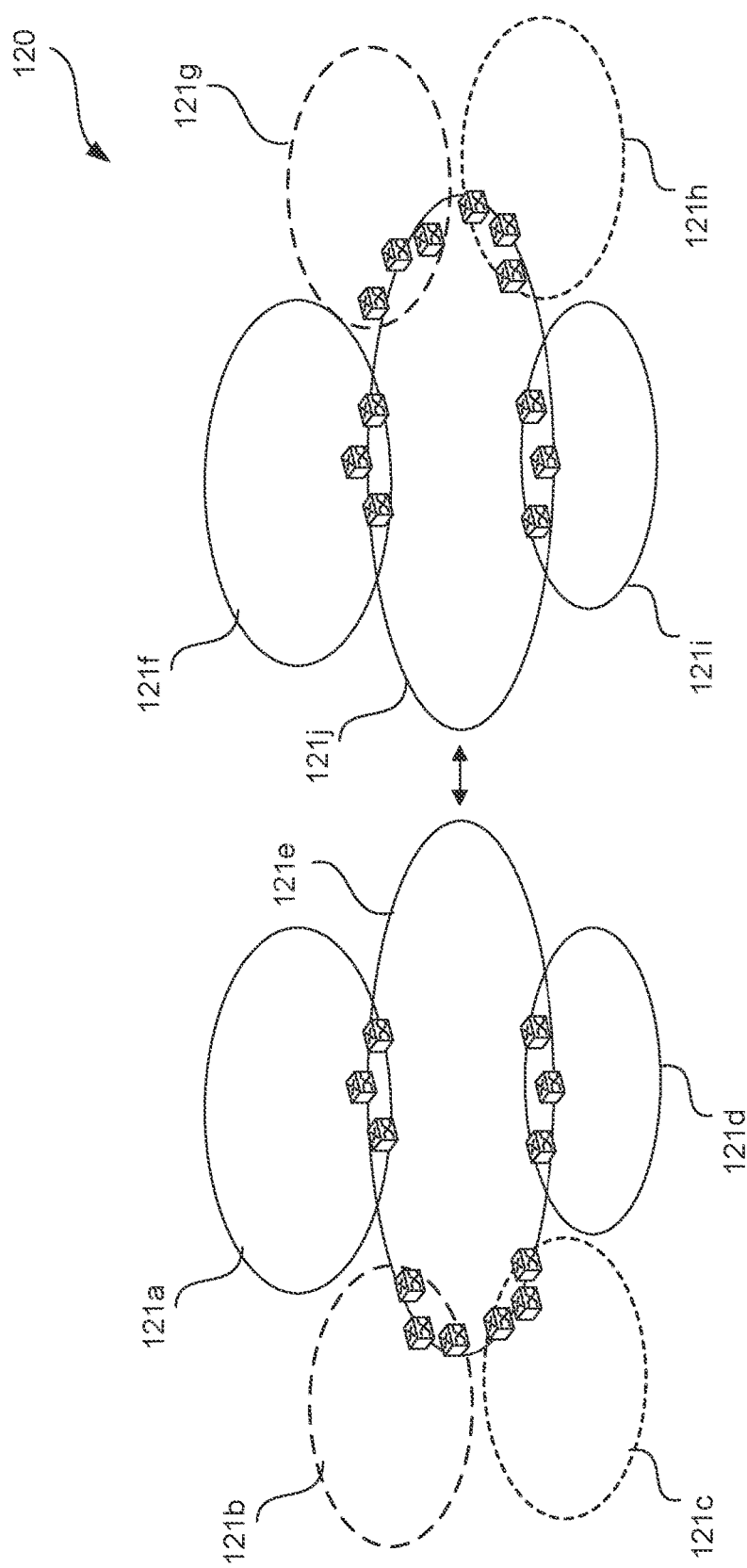

FIG. 1C illustrates an example multiple Hub-and-Spoke topology 120 for the multi-area SPB fabric, according to some aspects of the disclosure. In some examples, multiple Hub-and-Spoke topology 120 can include areas 121a-e and areas 121f-j. In this example, hub areas 121e and 121j are similar to hub area 101d discussed in FIG. 1A. In some examples, areas 121a-d and 121f-i can include one or more of Wide Area Networks (WANs), Campus Networks, Campus Area Networks, Corporate Area Networks, Datacenters, or the like.

Figure 1D:
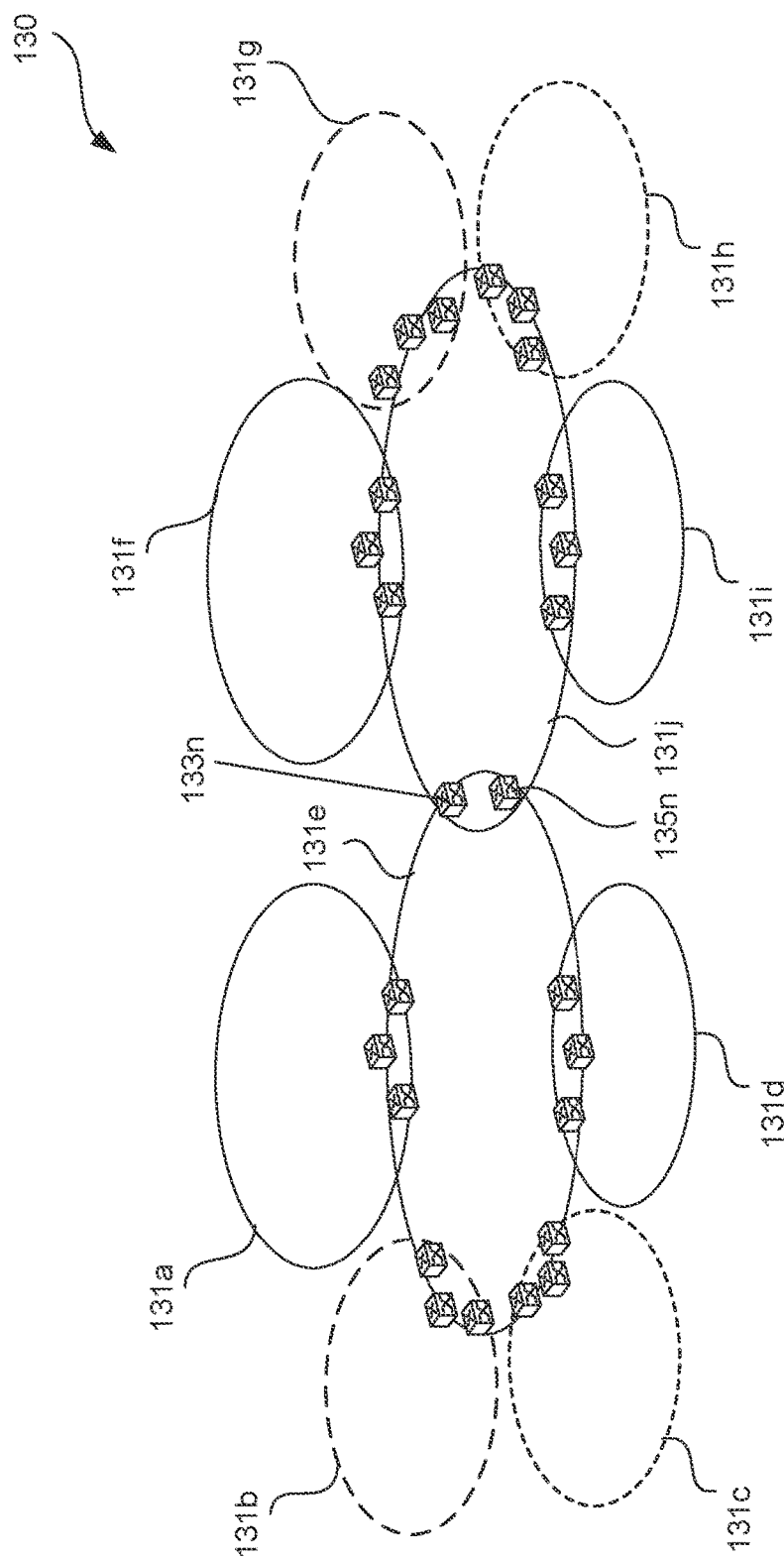

Multiple Hub-and-Spoke topology 120 can be replicated one or more times. For example, FIG. 1D illustrates another example multiple Hub-and-Spoke topology 130 for the multi-area SPB fabric, according to some aspects of the disclosure. In some examples, multiple Hub-and-Spoke topology 130 can include areas 131a-131e and areas 131f-131j. In this example, hub areas 131e and 131j are similar to hub area 101d discussed in FIG. 1A. In some examples, areas 131a-131d and 131f-131i can include one or more of Wide Area Networks (WANs), Campus Networks, Campus Area Networks, Corporate Area Networks, Datacenters, or the like. In some examples, multiple Hub-and-Spoke topology 130 can include boundary nodes 133n and 135n in addition to other boundary nodes.

The multi-area SPB fabric designs discussed herein allow for flexible network design, allowing customers to group nodes in areas based on their needs.

Figure 1E:
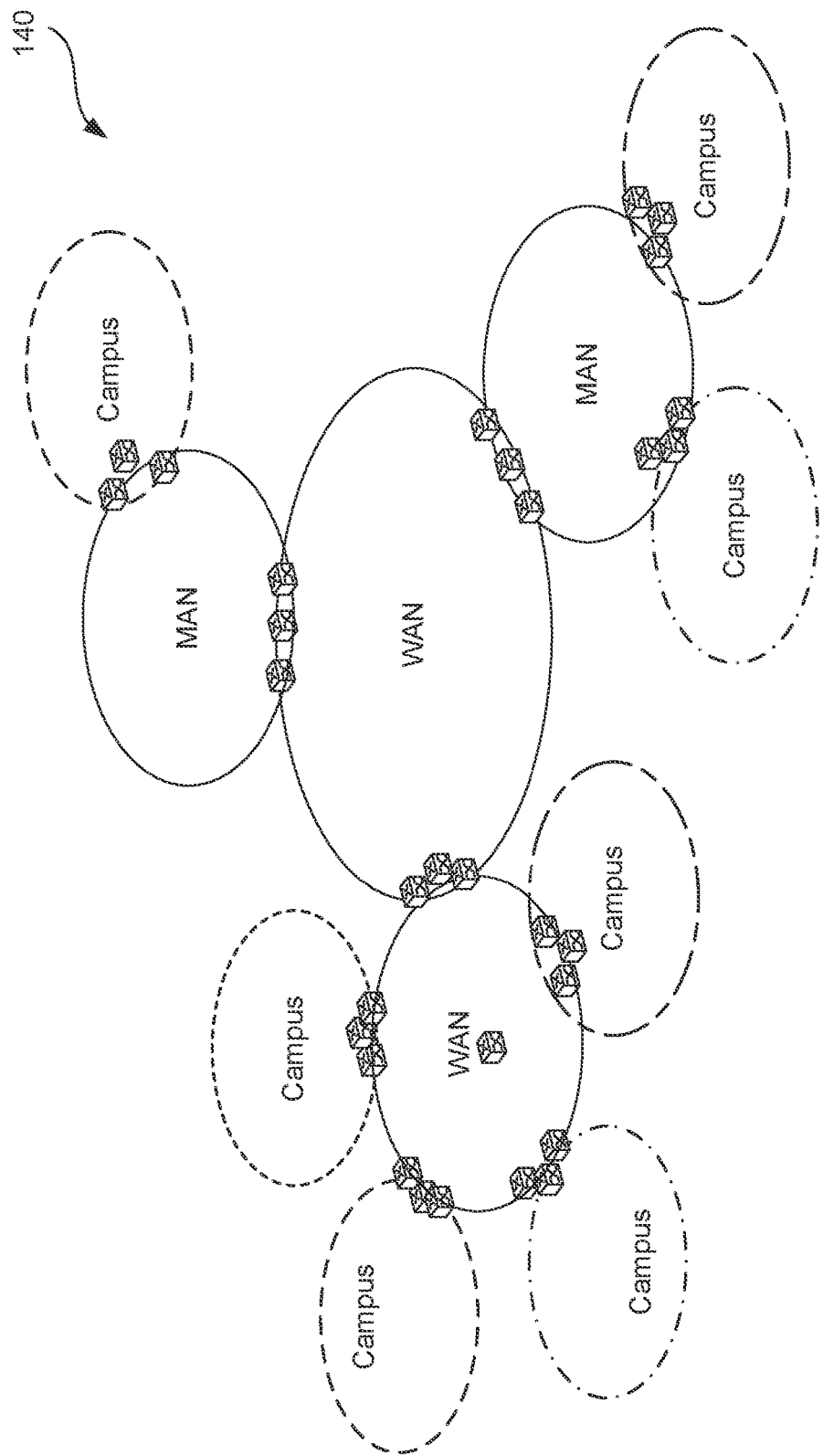

FIG. 1E illustrates an example multiple hierarchy level topology 140 for the multi-area SPB fabric, according to some aspects of the disclosure. As illustrated in FIG. 1E, the multi-area SPB fabric can include more than one layer of hierarchy. As a non-limiting example, as illustrated in FIG. 1E, the multi-area SPB fabric can include multiple campuses grouped around metropolitan area networks, which can be in turn grouped around wide area networks and so on.

According to some examples, the interior nodes in the areas of the multi-area SPB fabric (for example as illustrated in FIGS. 1A-1E) can be similar nodes running similar codes. For example, these interior nodes can be L1 nodes. In this example, the multi-area SPB fabric can connect two or more areas without the hierarchical requirements of having L1 nodes (e.g., L1 areas) and L2 nodes (e.g., an L2 area). According to some examples, one or more network areas can be added to (and/or removed from) the multi-area SPB fabric without extensive changes other network areas. For example, one or more network areas can be added to (and/or removed from) the multi-area SPB fabric without any changes to the interior node(s) of each existing area of the multi-area SPB fabric.

According to some aspects, the multi-area SPB fabric (for example as illustrated in FIGS. 1A-1E) can increase overall fabric node counts and does not add additional burden on existing fabric nodes. The multi-area SPB fabric can provide the ability to connect many areas in a network and can support "chained" architectures and have high (as a non-limiting example, at least 2×100 Gbps) throughput between areas.

Additionally, or alternatively, the multi-area SPB fabric can provide security by providing service security boundaries. The multi-area SPB fabric can also provide redundancy by, for example, supporting at least two boundary nodes for area interconnect, providing sub-second convergence when a boundary node fails, and keeping LSDBs per area. In some examples, one or more of the boundary nodes support Backbone Edge Bridge (BEB) functionality.

In some examples, the multi-area SPB fabric can provide simplicity and re-use by using few commands to configure, for example, two instances of ISIS. The multi-area SPB fabric can provide transparency by, for example, ISIDs/services numbering remaining network wide, ability to introduce multi-area without the need to upgrade network, and supporting existing Fabric Connect features across boundaries. Also, the multi-area SPB fabric can provide stability by providing a loop prevention method across areas.

Figure 2:
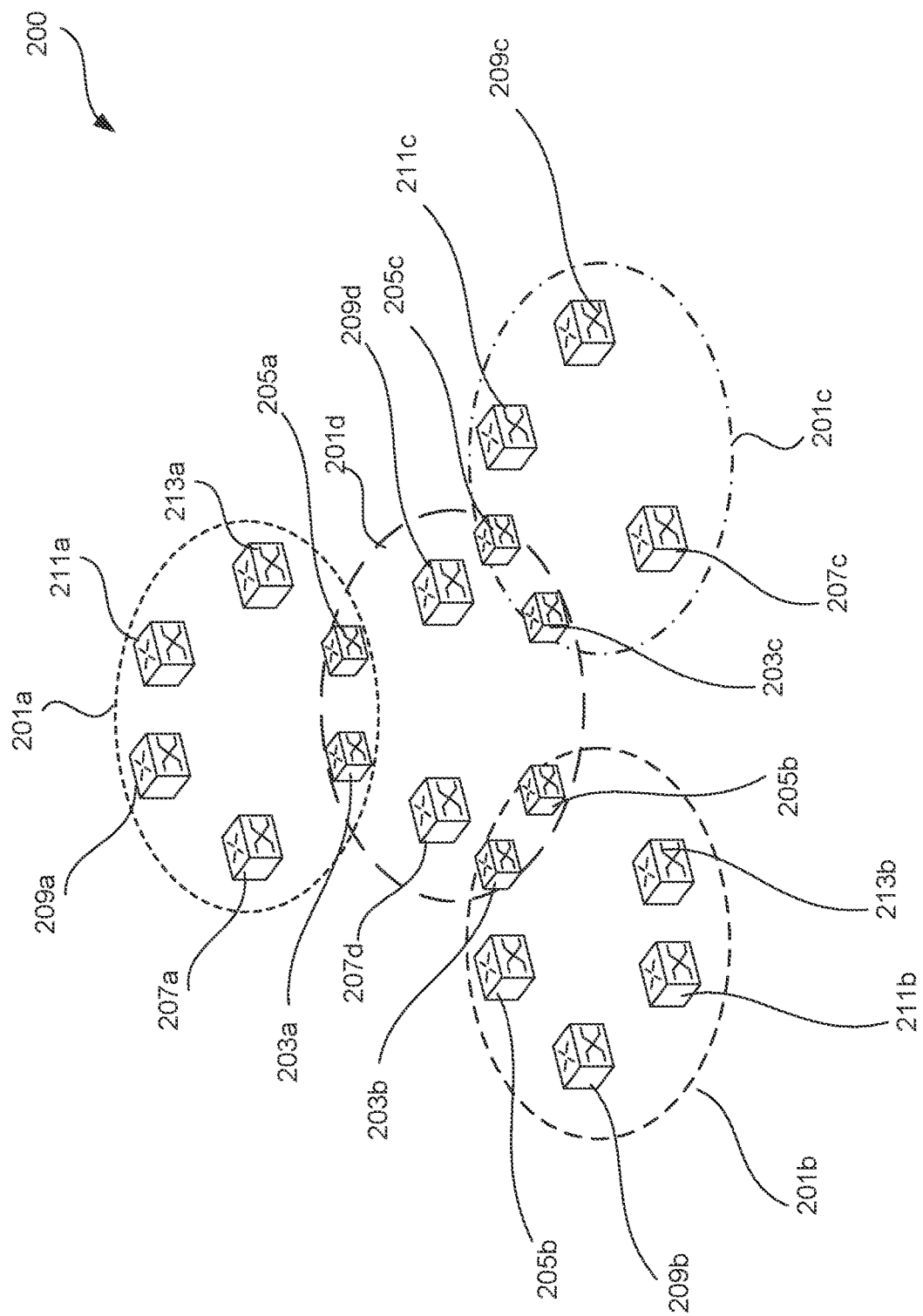
FIG. 2 illustrates another exemplary multi-area SPB topology, according to some aspects of the disclosure.

FIG. 2 illustrates another exemplary multi-area SPB topology, according to some aspects of the disclosure. FIG. 2 is illustrated as a Hub-and-Spoke Topology Hierarchy similar to multi-area SPB topology of FIG. 1A. However, the aspects of this disclosure can be applied to other topologies similar to topologies of FIGS. 1B-1E and/or other topologies In this exemplary aspect, multi-area SPB fabric 200 includes four areas 201a-201d, but can include other number of areas. Area 201a can include interior nodes 207a, 209a, 211a and 213a. Area 201a can also include boundary nodes 203a and 205a. Area 201b can include interior nodes 207b, 209b, 211b and 213b. Area 201b can also include boundary nodes 203b and 205b. Area 201c can include interior nodes 207c, 209c, and 211c. Area 201c can also include boundary nodes 203c and 205c. Area 201d can include interior nodes 207d and 209d. It is noted each of areas 201a-201d can include any number of interior and boundary nodes.

According to some aspects, and considering areas 201a and 201d, each one of boundary nodes 203a and 205a can have two ISIS topologies. One topology is for area 201a and the other topology is for area 201d. For all nodes in area 201a, there is an area topology that is visible to the nodes, and there is an out-of-area topology that is not visible to any nodes except for boundary nodes 203a and 205a. Similar topology applies to the nodes in area 201d.

Looking from the point of view of interior nodes, boundary nodes act as an area gateway to transport services to and from home area for services crossing area boundaries. Boundary nodes (e.g., boundary nodes 203a and 205a) summarize the services from home area (e.g., area 201a) and send to other areas (e.g., areas 201b-d). Boundary nodes (e.g., boundary nodes 203a and 205a) summarize services from other areas (e.g., areas 201b-d) and send, for example, the summarized services to home area (e.g., area 201a). When the traffic for the services cross from home area (e.g., area 201a) to another area (e.g., area 201d), appropriate packet translation occurs at the boundary nodes (e.g., boundary nodes 203a and 205a). The summarization and packet translation are done to avoid other areas (e.g., areas 201b-d) knowing about home area (e.g., area 201a) internal topological information and/or vice versa. For example, an interior node (e.g., node 207a of area 201a) does not need to know about the nodes beyond its home area (e.g., nodes in areas 201b-d). Therefore, multi-area SPB fabric 200 can increase fabric node counts and does not add additional burden on existing fabric nodes. Multi-area SPB fabric 200 can provide the ability to connect many areas in a network and can support "chained" architectures and have high throughput between areas without adding burden on the nodes. Although the hierarchy function description of FIG. 2 uses a Hub-and-Spoke topology for illustration, the same functional description can be applicable to the other topologies described herein.

According to some aspects, each of the boundary nodes 203a-c and 205a-c of FIG. 2 has two different topological databases. One database is for the home area and the other database is for out-of-area (e.g., hub area 201d). In some examples, these databases are ISIS link state databases (LSDB). The home area ISIS database is the LSDB of nodes from the home area. The out-of-area (e.g., hub area) ISIS LSDB is made up of nodes from other areas (e.g., hub area 201d). For example, for boundary nodes 203a and 205a of area 201a, the home area ISIS LSDB is made of nodes 207a, 209a, 211a, and 213a as well as boundary nodes 203a and 205a. The out-of-area (e.g., hub area) ISIS LSDB is made up of interior nodes 207d and 209d and boundary nodes 203a, 205a, 203b, 205b, 203c, and 205c. These two different and separate ISIS databases are from two different instances of ISIS. Boundary nodes 203a-c and 205a-c can perform shortest path (e.g., shortest path first (SPF)) computation for the home area using the home area ISIS database and SPF computation for the out-of area using the out-of-area ISIS database.

Although in FIG. 2 a boundary node is illustrated to connect two areas and have two different and separate ISIS instances (e.g., ISIS databases) for the areas (e.g., one separate ISIS instance (e.g., an ISIS database) for each area), the aspects of this disclosure are not limited to these examples. For example, a boundary node can connect more than two areas and can have more than two different and separate ISIS instances (e.g., ISIS databases) for areas (e.g., one separate ISIS instance (e.g., an ISIS database) for each area). Also, although FIG. 2 illustrates the multi-area SPB fabric as a Hub-and-Spoke Topology, the aspects of this disclosure are not limited to this topology and using multiple instances of an ISIS database at boundary node(s) can be applied to other multi-area SPB topologies.

According to some aspects of this disclosure, different design approaches can be used to create multiple instances of ISIS databases (e.g., home area ISIS database and out-of-area ISIS database). In some examples, a cloning approach can be used to create the multiple instances of an ISIS database. Additionally, or alternatively, a data structure based approach can be used to create the multiple instances of the ISIS database.

Figure 3A:
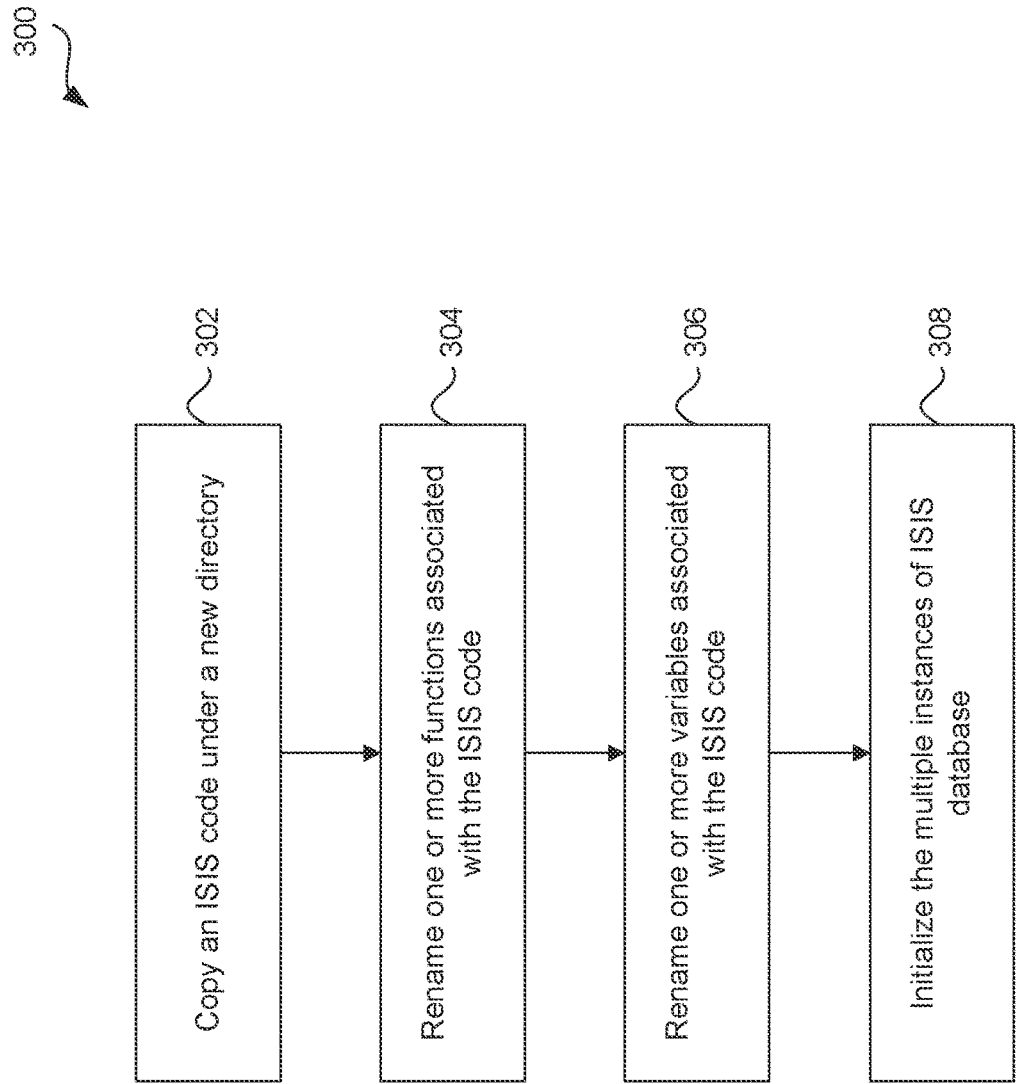
FIG. 3A is a flowchart illustrating example operations for implementing a cloning method for creating multiple instances of an ISIS database, according to some aspects of the disclosure.

A non-limiting example of the cloning approach is discussed with respect to FIG. 3A and boundary node 203a of area 201a of FIG. 2. Similar methods can be applied to other boundary nodes. FIG. 3A illustrates an example method 300 for implementing a cloning method for creating multiple instances of an ISIS database, according to some aspects of the disclosure. As a convenience and not a limitation, FIG. 3A may be described with regard to elements of FIG. 2. Method 300 may represent the operation of a system (e.g., a boundary node such as boundary node 203a of FIG. 2) implementing a cloning method for creating multiple instances of the ISIS database. Method 300 may also be performed by computer system 1200 of FIG. 12. Method 300 is not limited to the specific embodiments depicted in those figures, and other systems may be used to perform the method as will be understood by those skilled in the art. It is to be appreciated that not all operations may be needed, and the operations may not be performed in the same order as shown in FIG. 3A.

At 302, an ISIS code is copied under a new directory. For example, boundary node 203a of area 201a of FIG. 2 can be configured to copy an ISIS code associated with an ISIS database of area 201a (e.g., home area ISIS database) under a first directory. Additionally, or alternatively, boundary node 203a of area 201a of FIG. 2 can be configured to copy an ISIS code associated with an ISIS database of area 201d (e.g., out-of-area ISIS database) under a second directory.

At 304, one or more functions associated with the ISIS code are renamed. For example, boundary node 203a of area 201a of FIG. 2 can be configured to rename one or more functions associated with the ISIS database of area 201a (e.g., home area ISIS database) that was copied under the first directory. Additionally, or alternatively, boundary node 203a of area 201a of FIG. 2 can be configured to rename one or more functions associated with the ISIS database of area 201d (e.g., out-of-area ISIS database) that was copied under the second directory.

At 306, one or more variables associated with the ISIS code are renamed. For example, one or more global variables associated with the ISIS code can be renamed. For example, boundary node 203a of area 201a of FIG. 2 can be configured to rename one or more variables (e.g., global variables) associated with the ISIS database of area 201a (e.g., home area ISIS database) that was copied under the first directory. Additionally, or alternatively, boundary node 203a of area 201a of FIG. 2 can be configured to rename one or more variables (e.g., global variables) associated with the ISIS database of area 201d (e.g., out-of-area ISIS database) that was copied under the second directory.

At 308, the multiple (e.g., two in this example) instances of the ISIS database are initialized and are ready to be used. For example, boundary node 203a of area 201a of FIG. 2 initializes the multiple instances of the ISIS database. In some examples, the initialization can include two initializations for each copy of the ISIS database. Additionally, or alternatively, method 300 can include Sender Policy Framework processing. In a non-limiting example, the Sender Policy Framework processing can include two tasks and/or calling two functions twice in a single task. Additionally, or alternatively, method 300 can include packet (e.g., hello/LSP) processing. In a non-limiting example, the packet processing can include new timers and/or call the timer entry functions twice under the existing timers.

Although method 300 of FIG. 3A is discussed with respect to two instances of the ISIS database, the aspects of this disclosure are not limited to this example and method 300 can be applied to multiple instances of the ISIS database.

Figure 3B:
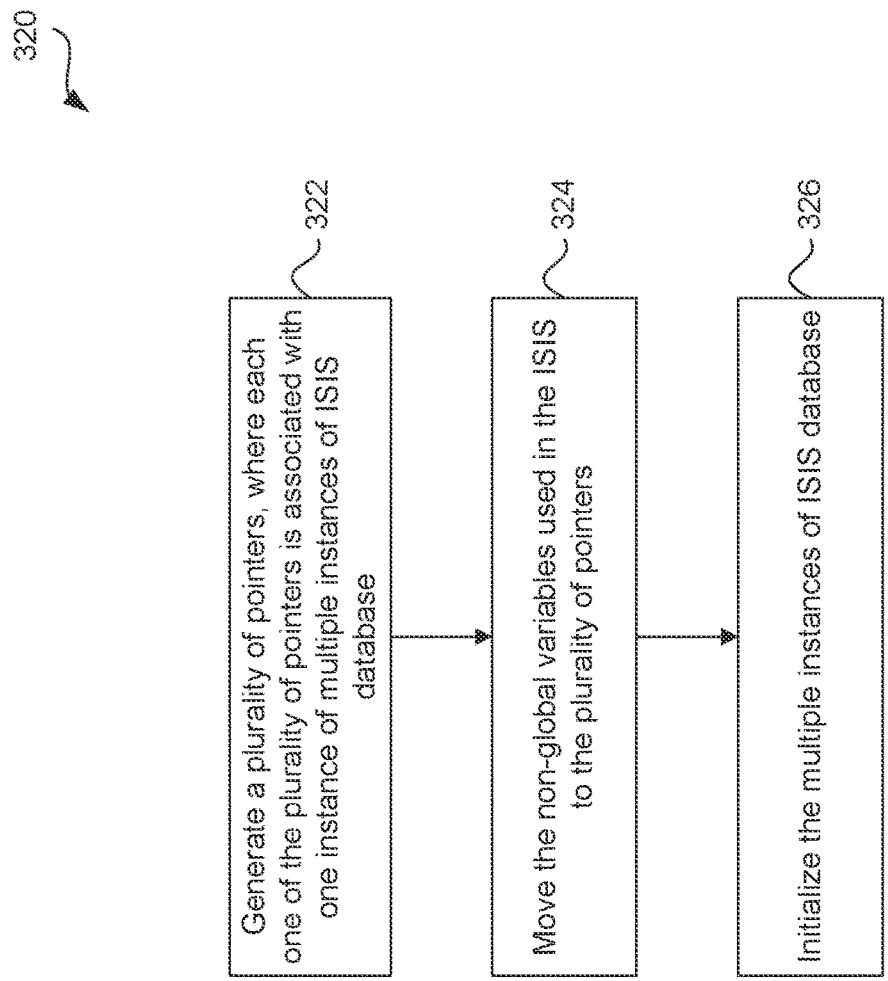
FIG. 3B is a flowchart illustrating example operations for implementing a data structure based method for creating multiple instances of an ISIS database, according to some aspects of the disclosure.

A non-limiting example of the data structure based approach is discussed with respect to FIG. 3B and boundary node 203a of area 201a of FIG. 2. Similar methods can be applied to other boundary nodes. FIG. 3B illustrates an example method 320 for implementing a data structure based method for creating multiple instances of ISIS database, according to some aspects of the disclosure. As a convenience and not a limitation, FIG. 3B may be described with regard to elements of FIG. 2. Method 320 may represent the operation of a system (e.g., a boundary node, such as boundary node 203a of FIG. 2) implementing a data structure based method for creating multiple instances of ISIS database. Method 320 may also be performed by computer system 1200 of FIG. 12. Method 320 is not limited to the specific embodiments depicted in those figures, and other systems may be used to perform the method as will be understood by those skilled in the art. It is to be appreciated that not all operations may be needed, and the operations may not be performed in the same order as shown in FIG. 3B.

At 322, a plurality of pointers are generated, where each one of the plurality of pointers is associated with one instance of multiple instances of ISIS database. For example, boundary node 203a of area 201a generates one pointer for each one of the multiple instances of ISIS database. In some examples, each pointer is associated with a memory block allocated for the corresponding instance of ISIS database during ISIS initialization when, for example, boundary node 203a boots up. In a non-limiting example, each one of the plurality of pointers can be an Ir_node pointer to memory block type ISNODE. In some examples, ISNODE can be an internal data structure that contains the relevant variables for a particular ISIS instance. For example, ISNODE can include information such as, but not limited to, the system identifier (ID), nickname, list of circuits, list of adjacencies, and the like. In some examples, majority of the ISIS code's data structures can be accessed using the Ir_node pointer. For example, one or more ISIS functions can use the Ir_node pointer to get the information needed for ISIS operation. However, the aspects of this disclosure are not limited to this example, and the plurality of pointers can include other types of pointers to other types of memory blocks.

According to some examples, and considering two instances of the ISIS database, one approach for generating the plurality (in this example, two) of pointers can include pairing the instance specific pointer to all functions. In this example, the instance specific pointer can become local and by passing a current instance specific pointer, two instances can access its own data structures correctly.

Another approach for generating the plurality (in this example, two) of pointers can include generating two global pointers— e.g., home pointer and remote pointer. In this example, a global variable can point either to the home pointer or the remote pointer. In this example, the global variable can be changed to different instances of the pointer to start the ISIS entry points.

At 324, the non-global variables used in the ISIS database are moved to the plurality of pointers. For example, boundary node 203a of area 201a can move the non-global variables used in the ISIS database to the plurality of pointers. For example, a first set of one or more non-global variables associated with a first ISIS instance is moved to a first pointer of the plurality of pointers and second set of one or more non-global variables associated with a second ISIS instance is moved to the second pointer of the plurality of pointers.

At 326, the multiple (e.g., two in this example) instances of ISIS database are initialized and are ready to be used. For example, boundary node 203a of area 201a of FIG. 2 initializes the multiple instances of ISIS database. In some examples, the initialization can include creating two memory blocks— one for each instance of ISIS. Additionally, or alternatively, the second memory block can be created when the second instance of ISIS is configured. Additionally, or alternatively, method 320 can include Sender Policy Framework processing. In a non-limiting example, the SPF processing can include two tasks— one for each instance of the ISIS database— and/or calling a function (for example, but not limited to, isisSpfTask( )) twice in a single task with passing the instance specific pointer.

According to some examples, at the beginning of a timer function, the pointer can point to the home instance of ISIS database and switch to the remote instance of ISIS database to perform timer processing, and then the pointer can switch back to the home instance. Alternatively, when a timer function is called, the timer function can be in an instance in which an ISIS yield was called. In this example, the timer function processes the existing instance and then switches to the other instance, and restores the original instance at the end of processing. Also, to handle nested yields, the current ISIS instance can be stored in a stack with a PUSH operation, and POPed when coming out of the nested loop. The functionality can be added in the yield code to handle such scenario. In some examples, the PUSH operation can add an element to a collection of elements (e.g., a stack), and the POP operation can remove a most recently added element that was not yet removed.

Additionally, or alternatively, method 320 can include packet (e.g., hello/LSP) processing. In a non-limiting example, for the packet processing entry points can be timer call back functions. In one example, four timer functions can be used. In some examples, these functions can be invoked twice for each instance with current instance specific pointer. However, other number of timer functions can also be used.

According to some aspects, method 320 can reduce image size associated with the multiple instances of the ISIS database and can result in applying enhancements and fixes once. Although method 320 of FIG. 3B is discussed with respect to two instances of the ISIS database, the aspects of this disclosure are not limited to this example and method 320 can be applied to multiple instances of the ISIS database.

Some aspects of this disclosure are directed to systems and methods for generating and/or using virtual node(s) (e.g., virtual SPB node(s)) in a multi-area fabric (e.g., a multi-area SPB fabric). Many fabric technologies use link-state protocols for their control plane. An SPB fabric is based on ISIS, a link-state based protocol in which all nodes in an area have a complete copy of the entire LSDB (Link State Database) of that area that includes the identification, topology, services, and the like of every node in the area. This allows every node to have the same view of the network and compute shortest-path unicast and multicast trees consistently. The size of the LSDB has a direct impact on the resource requirement for all participating nodes (e.g., RAM, CPU power, fast path ASIC capabilities, etc.). This imposes limits on possible network size and structure—especially regarding the number of nodes and number of services (such as L2 services, VRFs (Virtual Route Forwards), route prefixes, IP (Internet Protocol) multicast streams, and others).

The multi-area aspects discussed in this disclosure provide solutions to overcome the limits of the SPB fabric discussed in the above paragraph. In some examples, the multi-area aspects of this disclosure are applicable to the SPB fabric. Additionally, or alternatively, the multi-area aspects of this disclosure can be applicable to other fabric technologies.

According to some aspects, the multi-area SPB fabric (or multi-area for other fabric technologies) can include one or more virtual nodes. In some examples, the virtual nodes can replace and represent in the LSDB any number of nodes in any number of ISIS areas and the nodes' services (or a subset of their services) as a single entity. Complex network topologies, for example, including a very large number of real nodes and the actual links connecting them, can be substituted by a limited number of virtual links from the virtual node to the boundary nodes (the nodes that have direct ISIS adjacencies to other areas). This can allow for a much less CPU-intensive computation of, for example, the shortest path trees. Multiple virtual links can also allow for external areas to be connected to multiple boundary nodes in resilient and large bandwidth designs, but still be represented just once in the LSDB.

Figure 4A:
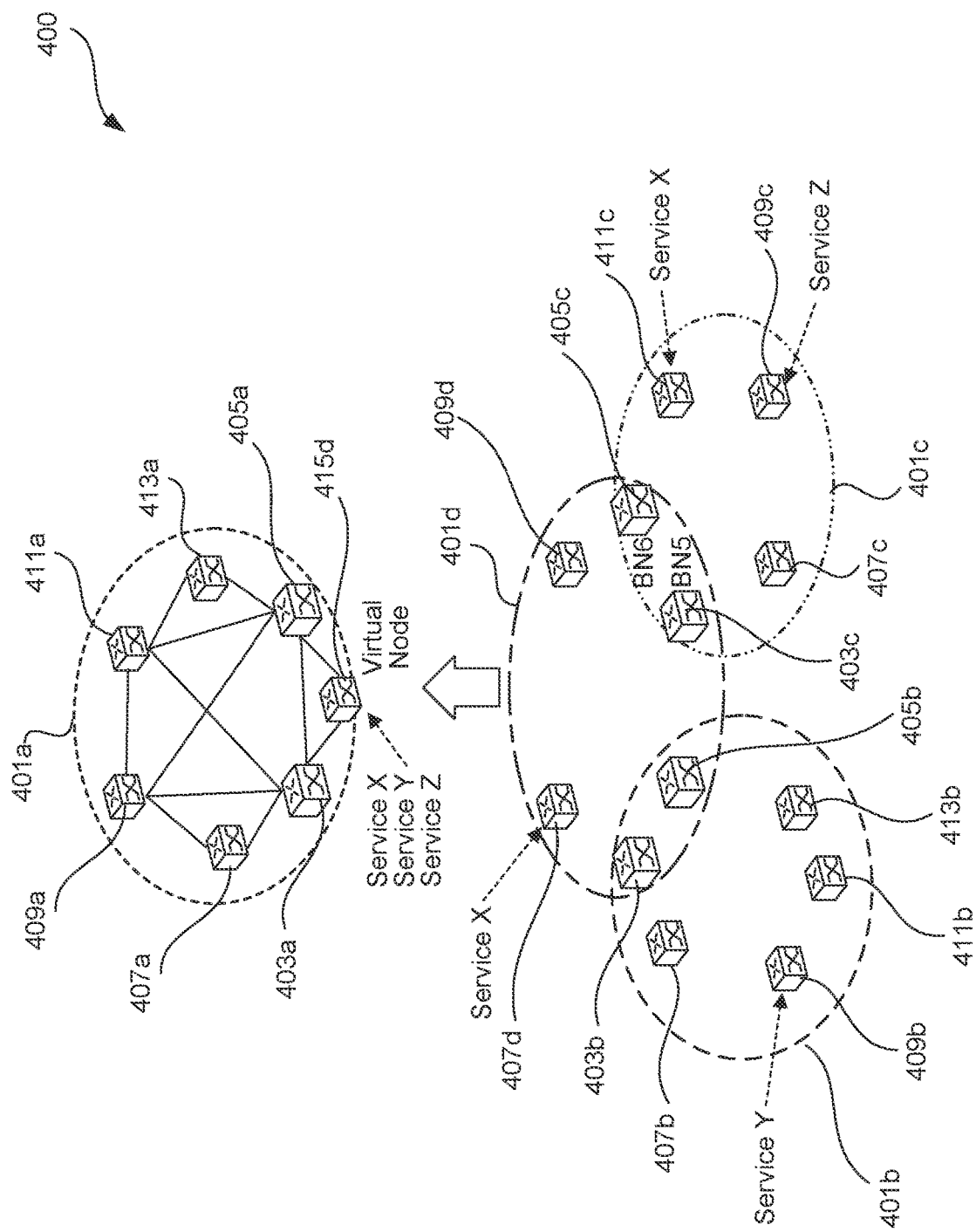
FIG. 4A illustrates an exemplary multi-area fabric using a virtual node, according to some aspects of the disclosure.

FIG. 4A illustrates an exemplary multi-area fabric (e.g., a multi-area SPB fabric) using a virtual node, according to some aspects of the disclosure. Although the virtual node in some aspects of this disclosure is discussed with respect to a multi-area SPB fabric, the aspects of this disclosure and the virtual node can be applied to other multi-area fabrics.

FIG. 4A illustrates multi-area SPB fabric 400 that includes areas 401a-d. Multi-area SPB fabric 400 is illustrated as a Hub-and-Spoke topology. However, the aspects of this disclosure can be applied to other topologies too. In this example, area 401a can include boundary nodes 403a and 405a and interior nodes 407a, 409a, 411a, and 413a. Area 401b can include boundary nodes 403b and 405b and interior nodes 407b, 409b, 411b, and 413b. In this example, area 401c can include boundary nodes 403c and 405c and interior nodes 407c, 409c, and 411c. Also, in this example, area 401d can include interior nodes 407d and 409d.

In this example, interior nodes 407a, 409a, 411a, and 413a of area 401a are outside of a communication area associated with areas 401b-d. Interior nodes 407b, 409b, 411b, and 413b of area 401b are outside of a communication area associated with areas 401a, 401c, and 401d. Interior nodes 407c, 409c, and 411c of area 401c are outside of a communication area associated with areas 401a, 401b, and 401d. And, interior nodes 407d and 409d of area 401d are outside of a communication area associated with areas 401a-c.

Although boundary nodes 403a and 405a are illustrated as nodes within area 401a, boundary nodes 403a and 405a are nodes that are shared between areas 401a and 401d. Similarly, although boundary nodes 403b and 405b are illustrated as nodes within area 401b, boundary nodes 403b and 405b are nodes that are shared between areas 401b and 401d. And, although boundary nodes 403c and 405c are illustrated as nodes within area 401c, boundary nodes 403c and 405c are nodes that are shared between areas 401c and 401d.

In a non-limiting example, interior node 407d of area 401d can be associated with service X. In this example, interior node 409b of area 401b can be associated with service Y, interior node 411c of area 401c can be associated with service X, and interior node 409c of area 401c can be associated with service Z. According to some examples, services X, Y, and Z can include services provided by a network node, such as, but not limited to, services provided by computers, routers, gateways, modems, printers, scanners, TVs, smart phones, Internet of Things (IoT) devices, bridges, switches, and the like.

In this example, area 401a can include virtual node 415d. Virtual node 415d of area 401a can represent the adjacent area(s) to area 401a. In some examples, virtual node 415d of area 401a is configured to represent areas 401b-d and their associated services in area 401a. For example, as illustrated in FIG. 4A, virtual node 415d of area 401a is configured to represent services X, Y, and Z associated with area nodes 401b-d. Each area in multi-area SPB fabric 400 has its own perspective. In other words, for example, for area 401a, areas 401b, 401c, and 401d (and their corresponding nodes and/or services) can be represented by virtual node 415d. According to some aspects, by using virtual node(s) in the multi-area fabric (e.g., multi-area SPB fabric 400), complex topologies can be represented by a virtual node (e.g., a single virtual node) representing some or all the services outside the home area.

In this example, an interior node (e.g., node 407a) of area 401a can have access to services of other nodes outside of area 401a and can communicate with the other nodes outside of area 401a without being aware of the other nodes outside of area 401a. The services of the other nodes outside of area 401a are represented by virtual node 415d. Therefore, interior node 407a can access these services through virtual node 415d.

According to some examples, a structure of virtual node 415d can hide behind virtual node 415d. Each virtual node (e.g., virtual node 415d) can have its own system identifier (ID), nickname, set of LSPs, and the like. In some examples, the system ID and the nickname can be auto-derived from the manual area and can be over-ridden by explicit configuration.

According to some examples, virtual node 415d can connect an intra-area shortest path and an out-of-area shortest path logically. In other words, virtual node 415d connects home area 401a shortest path and out-of-area (e.g., area 401d) shortest path logically. In some aspects, area virtual nodes are created (e.g., emulated) by boundary nodes, and are logical ISIS nodes specifically created (e.g., emulated) for providing a path out of the area. For example, virtual node 415d is created (e.g., emulated) using boundary nodes 403a and 405a of area 401a. Boundary nodes 403a and 405a can be real (e.g., physical) ISIS nodes (such as routing switches) that have adjacencies in more than one ISIS area, maintaining separate copies of each LSDBs (Link State Databases) corresponding to each area. Boundary nodes 403a and 405a can run one SPB (and ISIS) instance for each area. According to some examples, virtual node 415d is used in the calculation for the shortest path tree and to advertise the services of one or more of areas 401b-d, and is used by the interior nodes as a SPB node. In some examples, an interior node (e.g., nodes 407a, 409a, 411a, and/or 413a) can compute a path to virtual node 415d, can transmit traffic to virtual node 415d based on services extended by virtual node 415d, and/or can receive traffic from virtual node 415d based on the services extended by virtual node 415d. Virtual node 415d is not a node used in the standard ISIS protocol, according to some examples. In some examples, the function of virtual node 415d can be to bring view of an outside area (e.g., areas 401b-d) as a single ISIS entity to all nodes in the home area (e.g., area 401a). In other words, a regular (non-boundary) node (e.g., nodes 407a, 409a, 411a, and/or 413a) can view outside area(s) (e.g., areas 401b-d) as an ISIS node, which has ISIS LSDB information from that area(s).

As discussed above, boundary nodes (e.g., boundary nodes 403a and 405a) can exist in multiple (e.g., two) areas and run one SPB (and/or ISIS) instance for each. The virtual node (e.g., virtual node 415d) representing the first instance area is represented in the second instance area, as a synthesized representation of all (or some of) the services on all (or some of) the nodes that are not visible across area boundary. Another virtual node representing the second area is represented in the first area. In other words, virtual node 415d of area 401a represents all (or some of) services on all (or some of) the nodes of areas 401b-d in area 401a. In some examples, boundary nodes 403a and 405a can also create another virtual node (not shown in FIG. 4A) that represents all (or some of) services on all (or some of) the nodes of areas 401a in area 401d.

FIG. 4A illustrates area 401a view. Area 401a view is the home area view for the interior nodes (e.g., nodes 407a, 409a, 411a, and 413a) and boundary nodes (e.g., nodes 403a and 405a). Boundary nodes 403a and 405a setup virtual node 415d based on link state information from out-of-area LSDB and propagate LSPs within area so that this home area 401a view is established in all interior nodes. As stated above, in this example, boundary nodes 403a and 405a have two ISIS LSDBs, one area view is based on the ISIS LSDB in one SPB instance and the other area view is based the second SPB instance.

In some examples, during a shortest path (e.g., shortest path first) calculation for home area 401a, virtual node 415d is considered as though it is part of area 401a. Boundary nodes 403a and 405a create virtual node 415d in their home area ISIS database based on link state information in the LSPs received from out-of-area nodes (e.g., LSPs derived from an out-of-area ISIS database). For example, one of the boundary nodes (e.g., either 403a or 405a) in area 401a will send out LSPs towards area 401a. The entire area(s) 401b, 401c, and/or 401d will be represented in area 401a (home area) view as virtual node 415d. Similarly, the entire area 401a can be represented in, for example, area 401d as a virtual node.

According to some aspects, boundary node 403a receives LSDB in an out-of-area ISIS LSDB through interfaces of boundary node 403a connecting to area 401d. Boundary node 403a creates virtual node 415d as though a new adjacency is formed in home area 401a. In some examples, only one out of many boundary nodes from an area sends the LSPs representing each virtual node. Boundary node 405a can also advertise a virtual adjacency with virtual node 415d. Boundary node 405a also has access to information to create virtual node 415d in LSPs from area 401d nodes in LSDB, but boundary nodes will not compete in overwriting each other's sequence numbers regarding virtual node 415d. Except for failover (boundary node failure) scenarios, boundary node 405a will let boundary node 403a create LSPs regarding virtual node 415d in area 401a.

As discussed above, boundary nodes 403a and 405a can create two virtual nodes. One virtual node 415d representing areas 401b-d in area 401a and one virtual node representing area 401a in area 401d. In some examples, even though both virtual nodes are created by the same boundary nodes (e.g., boundary nodes 403a and/or 405a), they will not be in the same ISIS instance; rather, each of the virtual nodes will only be present in one instance, summing up the services in the other one. In other words, a first virtual node in a first ISIS instance summarizes the services in a second ISIS instance and a second virtual node in the second ISIS instance summarize the services in the first ISIS instance, according to some examples.

Although one virtual node is illustrated in FIG. 4A in area 401a, it is noted that one or more other areas 401b-d can include their corresponding virtual node to represent outside areas and their associated services. Additionally, or alternatively, although one virtual node 415d is illustrated for area 401a, area 401a can include multiple virtual nodes. In some examples, for scaling purposes, multiple areas can be represented as separate virtual nodes to separate services (e.g., routes, MC streams, etc.) for each area.

According to some aspects, depending on the services, boundary nodes can expose one or more virtual nodes in the home area to represent collections of nodes from the out-of-area view. In one example, as illustrated in FIG. 4A, virtual node 415d can represent all three areas 401b-d (e.g., represent nodes and/or services in all three areas 401b-d). In this example, virtual node 415d (e.g., a single virtual node) is exposed to all areas. In other words, boundary nodes 403a and 405a can create a single virtual node 415d to represent all nodes in area 401d including virtual nodes in area 401d (not shown), which in turn represent their home areas 401b and 401c. In this example, virtual node 415d as seen in area 401a will represent services for all nodes in area 401d and areas 401b and 401c (e.g., immediately adjacent area 401d as well as areas connected through it, in this case areas 401b and 401c).

Figure 4B:
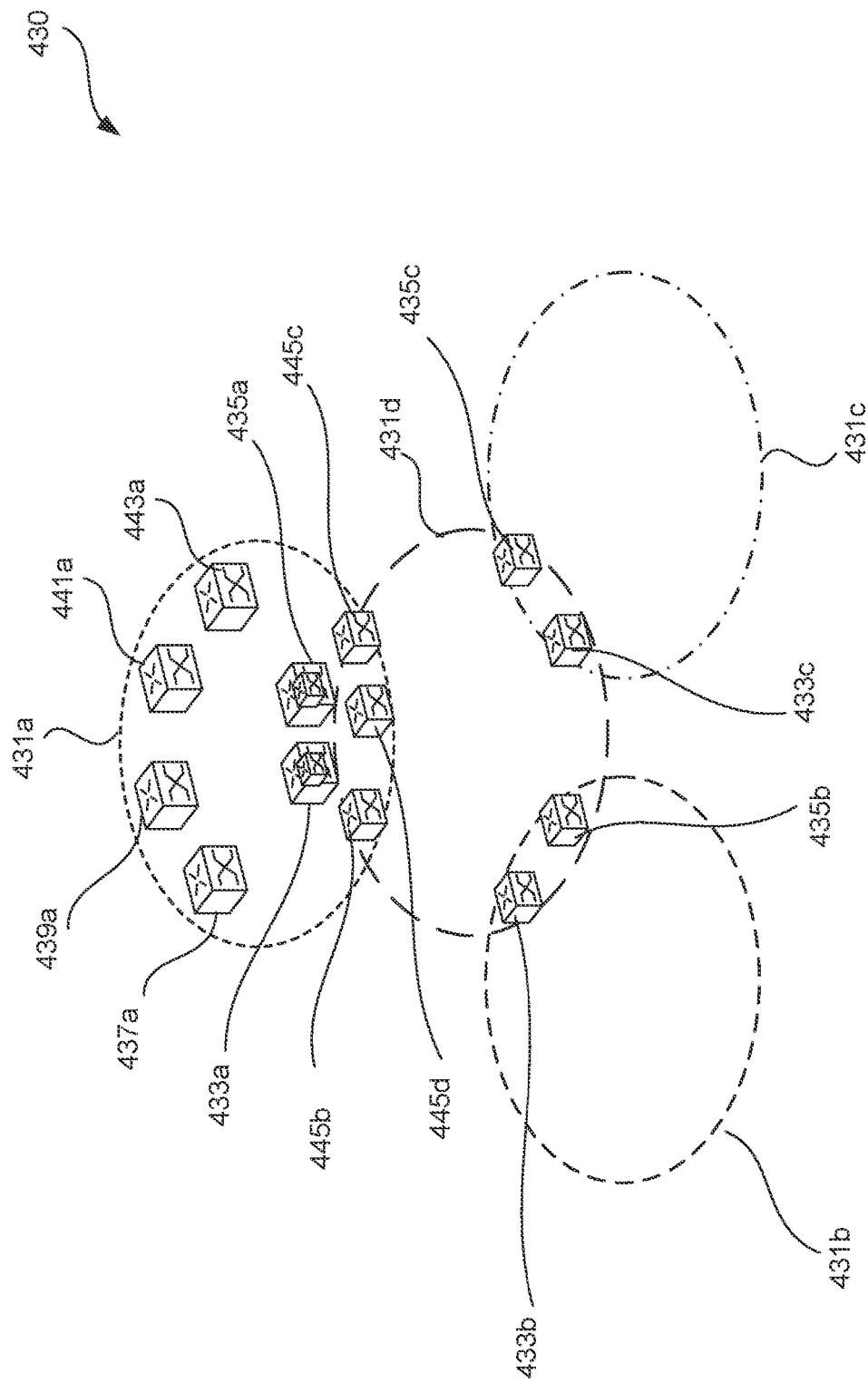
FIG. 4B illustrates an exemplary multi-area fabric using a plurality of virtual nodes, according to some aspects of the disclosure.

Alternatively, multiple virtual nodes can be exposed. FIG. 4B illustrates an exemplary multi-area fabric (e.g., a multi-area SPB fabric) using a plurality of virtual nodes, according to some aspects of the disclosure. In this example, multi-area fabric 430 includes areas 431a-d. Multi-area fabric 430 can include boundary nodes 433a and 435a that connect areas 431a and 431d. Boundary nodes 433a and 435a can create virtual node 445d to represent services in area 431d. Additionally, boundary nodes 433a and 435a can create additional virtual nodes 445b and 445c. For example, boundary nodes 433a and 435a can create a second virtual node 445b to represent (all or some of) services in area 431b. Additionally, or alternatively, boundary nodes 433a and 435a can create a third virtual node 445c to represent (all or some of) services in area 431c.

In the example of FIG. 4B, area 431a can include interior nodes 437a, 439a, 441a, and 443a. Multi-area fabric 430 can include boundary nodes 433b and 435b that connect areas 431b and 431d. Multi-area fabric 430 can include boundary nodes 433c and 435c that connect areas 431c and 431d.

Returning to FIG. 4A FIG. dB, in some examples, virtual nodes representing collections of physical nodes in remote areas can be exposed and/or even one virtual node for each physical node can be chosen to be exposed in the out-of-area view. For example, interior node 407a from area 401a can be represented in area 401d as a virtual node representing services on node 407a, along with a second virtual node in area 401a, which will represent services on all nodes in area 401a except for node 407a. This virtual node (virtual node for node 407a) created by boundary nodes 403a and 405a in area 401d, can in turn be carried on by boundary nodes to remote areas (e.g., by boundary nodes 403c and 405c to expose this virtual node (virtual node for node 407a) in area 401c, making the services on node 407a directly accessible in distant areas).

In some examples, the number of virtual nodes created in an area can depend on the services provided by that area and/or other area(s) in the multi-area SPB fabric. As a non-limiting example, Layer 2 Virtual Service Network (L2VSN) services can be represented by the immediately adjacent area's virtual node, while for other services such as Multicast over SPB, IP Shortcut and Layer 3 Virtual Service Network (L3VSN) remote area virtual nodes will be exposed. For example, for all services except for L2VSN, area 401a can include two additional virtual nodes (445b and 445c in FIG. 4B— in addition to virtual node 415d) in home area view as connected through boundary nodes 403a and 405a. For example, the two additional virtual nodes (445b and 445c in FIG. 4B— in addition to virtual node 415d) can include LSPs for multicast streams, routes for IPSC and so on, but will not advertise any of the L2VSN I-SIDs (Service Instance Identifiers). In some examples, as L2VSN I-SIDs can be advertised in area 401a by virtual node 415d. In other words, in some aspects of this disclosure, the number of virtual nodes can depend on the services of the area(s) that each virtual node represents.

According to some aspects, using policy applied on the boundary nodes, the multi-area SPB fabric can control which services from a home area are exported in the out-of-area view by being included in the LSPs of the corresponding virtual node. In a non-liming example, an L2VSN I-SID can be stopped from crossing area boundaries. In this non-liming example, other services (e.g., multicast streams, routes for IPSC, and the like) can be allowed to cross area boundaries.

According to some aspects, using a virtual node that is emulated using two or more boundary nodes can provide additional redundancy, usability, and/or security to the multi-area fabric. For example, an interior node of an area can communicate with and/or use services of the virtual node of that area (which can represent out-of-area services) instead of using two or more boundary nodes of that area. In a non-liming example, if the interior node communicates with a boundary node (e.g., instead of a virtual node) and the boundary node is unavailable, the interior node changes and/or updates, for example, its database(s) to communicate with another boundary node. However, by communicating with the virtual node, the interior node does not change and/or update, for example, its database(s) if the boundary node is unavailable. In some examples, the interior node does not change and/or update, for example, its database(s) because the interior node is communicating with the virtual node (e.g., uses the address of the virtual node) instead of communicating with the boundary nodes (e.g., using the address(es) of the boundary nodes that emulate the virtual node).

Figure 5:
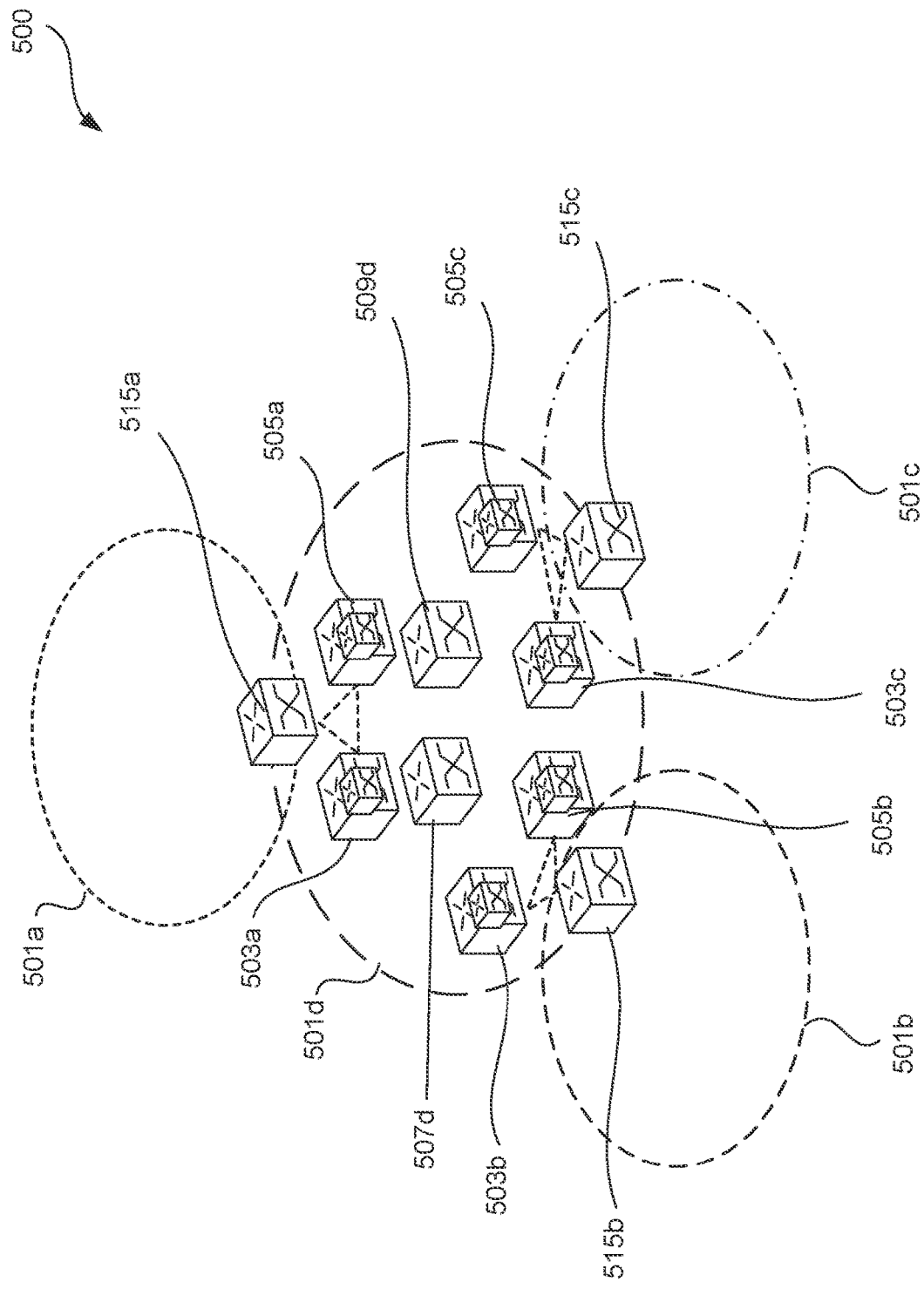
FIG. 5 illustrates an exemplary hub view in a multi-area fabric having a plurality of virtual nodes, according to some aspects of the disclosure.

FIG. 5 illustrates an exemplary hub view in a multi-area fabric (e.g., a multi-area SPB fabric) having a plurality of virtual nodes, according to some aspects of the disclosure. In this example, multi-area SPB fabric 500 includes four areas 501a-d. Area 501d includes boundary nodes 503a and 505a shared with area 501a, boundary nodes 503b and 505b shared with area 501b, and boundary nodes 503c and 505c shared with area 501c. Area 501d also includes interior nodes 507d and 509d.

The boundary nodes view of area 501d is based on area 501d ISIS LSDB. In FIG. 5, each of boundary nodes 503a-c and 505a-c has two ISIS LSDB databases. The out-of-area LSDB of area 501a boundary nodes 503a and 505a has a virtual node 515a representing area 501a. Similarly, the out-of-area LSDB of area 501b boundary nodes 503b and 505b has a virtual node 515b representing area 501b. The out-of-area LSDB of area 501c boundary nodes 503c and 505c has a virtual node 515c representing area 501c. The SPF computation for area 501d is based on area 501d LSDB, which contains virtual nodes 515a-c. A virtual node for a home area is created in boundary nodes when the boundary node ISIS is established. For example, when area 501c boundary node 503c's second ISIS is enabled, the boundary node 503c's ISIS brings up the virtual node 515c. The boundary node 503c's ISIS may send out LSPs representing virtual node 515c towards area 501d, if boundary node 503c is elected as the primary boundary node. In some examples, virtual node 515c has adjacencies with boundary nodes 503c and 505c within the LSDB of area 501d. Similarly, virtual nodes are created in boundary nodes of area 501a and area 501b.

According to some aspects of this disclosure, the boundary nodes of the multi-area SPB fabric can perform a unicast shortest path computation and/or a multicast shortest path computation. For example, for the unicast shortest path computation, the computation by boundary nodes (e.g., boundary nodes 503a and 505a of FIG. 5) create two unicast shortest path trees, one for each area view. The unicast shortest path tree for the first view is created for the paths of connectivity of nodes internal to the first area (e.g., area 501d of FIG. 5). The unicast tree for the second view is for the paths of the second area (e.g., area 501a of FIG. 5). These two trees are independent loop free trees computed from first area ISIS LSDB and second area ISIS LSDB. In some examples, loop free tree can include a unicast shortest path tree and/or a multicast shortest path without any loops. The boundary nodes (e.g., boundary nodes 503a and 505a of FIG. 5) transfer traffic between these two trees. Since SPF computation is on LSDBs that include virtual nodes, the virtual nodes can be considered equivalent nodes in the shortest path tree.

When an interior node (e.g., node 507d of FIG. 5) sends traffic to a destination in a different area (e.g., area 501a), the traffic is directed to boundary nodes (e.g., nodes 503a and 505a of FIG. 5) of the destination area using an address of a virtual node (e.g., virtual node 515a) of a corresponding area (e.g., area 501a). In some examples, the traffic is sent to the virtual node (e.g., virtual node 515a) and the traffic lands on one of the boundary nodes (e.g., one of nodes 503a and 505a), since the virtual node is reachable using the boundary nodes. In these examples, whichever boundary node the traffic lands on can forward the traffic out of the area (e.g., area 501a). The boundary nodes direct the traffic inside the area (e.g., area 501a). As another example, an interior node in area 501a sends traffic to a destination in area 501c. The traffic is sent by the interior node in area 501a to a virtual node representing area 501d, or to a virtual node representing area 501c (depending on whether virtual node representing area 501c is also exposed in area 501a, or else all services in area 501a are included in virtual node representing area 501d). In other words, if a virtual node representing area 501c is present in area 501a, the interior node in area 501a sends the traffic to the virtual node representing area 501c. If a virtual node representing area 501c is not present in area 501a, the interior node in area 501a sends the traffic to the virtual node representing area 501d. Then, the virtual node representing area 501d can send the traffic to a virtual node representing area 501c is present in area 501d. Since out-of-area virtual nodes are reachable through boundary nodes, the boundary nodes perform address translation depending on the service before forwarding the traffic on the backbone tree, e.g., a tree associated to area 501d. The boundary nodes send traffic across area 501d to the destination area 501c through area 501d's shortest path tree.

Regarding the multicast shortest path computation, a multicast tree interior to an area can be established based on the home area view with consideration of multicast services leaked from out-of-area LSDB. The interior multicast tree can be computed based on the home area ISIS LSDB, which contains information about the virtual nodes. From the interior node point of view, multicast services from other areas are attached to the virtual nodes corresponding to the other areas. For example, a multicast service from area 501a will be seen by an interior node from area 501d as though the service is attached to the virtual node 515a. According to some aspects, all boundary nodes can be part of the multicast tree for which their corresponding virtual nodes are a part of. In these examples, a receiver bit (e.g., Rx bit) is to be set in the Type-Length-Values (TLVs) in the LSPs of the boundary nodes.

According to some aspects, a virtual node (e.g., virtual node 515a) is created by a trigger from, for example, a state machine when a boundary node (e.g., boundary node 503a and/or 505a) is chosen as a designated node. In this example, one virtual node can be created in the home instance and another virtual node can be created the remote instance. In a non-limiting example, creating the virtual node can include one or more of initializing LSP descriptors for the virtual node, allocating LSP0, filling in TLVs for LSP0, and transmitting the TLVs to the local area and remote area. Additionally, or alternatively, creating the virtual node can include one or more of initializing a NNI list, adding ISIS ADJ between the boundary node and the virtual node (e.g., advertising TLV in LSP0 of the physical node), and adding ISIS ADJ between the virtual node and the boundary node (e.g., advertising TLV in LSP0 of the virtual node). It is noted that the aspects of this disclosure are not limited to these operations and other methods can be used for creating the virtual node.

In another non-limiting example, if there is a single boundary node, the boundary node can create the LSP for the virtual node with an adjacency to itself. The boundary node then adds an adjacency to the virtual node in its own LSP and sends both the LSPs to the network. When another boundary node is present or if there were multiple boundary nodes, then a primary boundary node creates the LSP for the virtual node with an adjacency from the virtual node to each of the boundary nodes, and each of the boundary nodes adds the adjacency to the virtual node in its LSP. Therefore, the primary node creates the LSP for the virtual node and adds the adjacency to each of the boundary nodes in the virtual node LSP and each of the boundary nodes is responsible for updating its LSP with the adjacency to the virtual node.

It is noted that the aspects of this disclosure are not limited to these operations and other methods can be used for creating the virtual node.

According to some aspects, the responsibility of creating and updating the LSPs for the virtual node can lay with the designated boundary node. If the designated boundary node fails, one of the other boundary nodes takes over the role of the designated boundary node. The new designated boundary node can start advertising the LSPs for the virtual node and can try to keep the TLV information in the same LSP fragment. In some examples, when a node (e.g., the boundary node) advertises an LSP that contains much information (e.g., more than 1492 bytes), the node can divide the LSP to multiple LSP fragments to carry more information. In these examples, the new designated boundary node can keep the TLV information in the same LSP fragment.

According to some aspects of this disclosure and comparing virtual node 415d of FIG. 4A and virtual node 515a of FIG. 5, these two virtual nodes belong to two different domains (e.g., databases). For example, virtual node 415d of FIG. 4A belongs to the database associated with area 401a, and virtual node 515a of FIG. 5 belongs to the database associated with area 501d. In other words, the database (e.g., the LSDB) of area 401a includes information associated with interior nodes of area 401a (e.g., nodes 407a, 409a, 411a, and 413a) and information associated with virtual node 415d representing area 401d. The database (e.g., the LSDB) of area 501d includes information associated with interior nodes of area 501a (e.g., nodes 507a and 509a) and information associated with virtual nodes 515a-c representing areas 501a-c, respectively. In some examples, two virtual nodes 415d and 515a do not "see" each other because they are part of different domains (e.g., databases).

Some aspects of this disclosure are directed to methods and systems for automatic configuration of boundary node(s) and/or virtual node(s) in a multi-area fabric (e.g., a multi-area SPB fabric). In some aspects, the automatic configuration of boundary node(s) and/or virtual node(s) includes configuring the boundary node(s) and/or the virtual node(s) without user intervention.

According to some examples, for the ISIS protocol, the area identifier (ID) of adjacent nodes must match in order to form adjacencies and allow protocol operation. Additionally, or alternatively, SPB/ISIS nodes have system IDs unique to the area they are a part of. Also, SPB nodes have nick-names (such as, but not limited to, a 5 nibble number) unique to each area in order to generate unique multicast forwarding information base (FIB) entries for each to transport broadcast and multicast in the fabric, according to some examples. In a multi-area fabric (e.g., a multi-area SPB fabric), a boundary node that connects multiple areas has an area ID for each of the connected areas.

Some aspects of this disclosure are directed to methods and systems for automatically configuring the boundary node(s) (and/or virtual nodes) in the multi-area fabric that connect two or more areas. A multi-area fabric (e.g., a multi-area SPB fabric) using virtual nodes has additional configuration for the virtual node (such as, but not limited to, system ID, nick-name, and the like) for correct operation. The boundary node can represent each connected area as virtual nodes in the instances corresponding to all other areas. This configuration is consistent on all boundary nodes that border the same configuration of areas.

Figure 6:
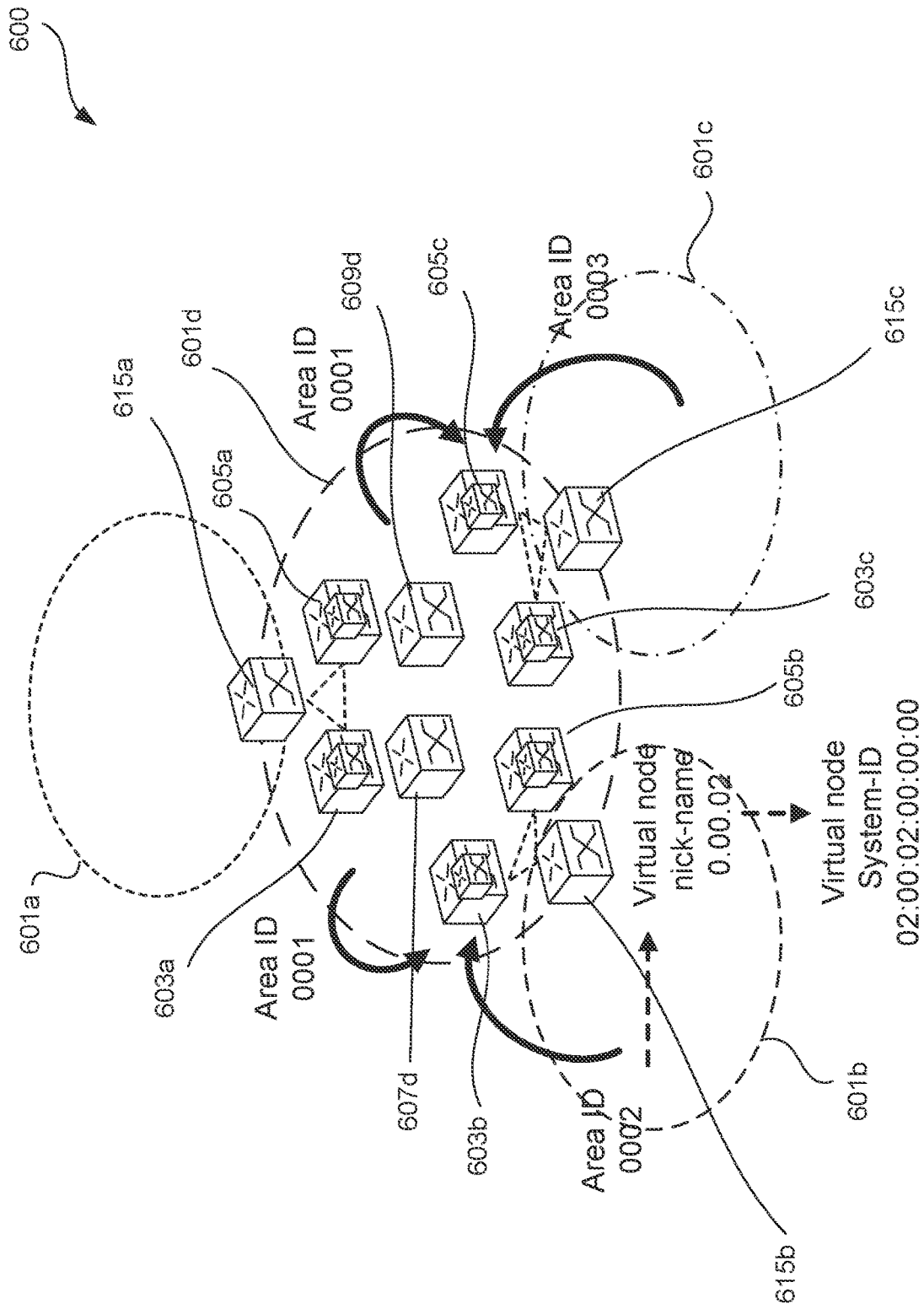
FIG. 6 illustrates an exemplary multi-area SPB fabric automatically configuring boundary node(s) and/or virtual nodes, according to some aspects of the disclosure.

FIG. 6 illustrates an exemplary multi-area SPB fabric automatically configuring boundary node(s) and/or virtual nodes, according to some aspects of the disclosure. In this example, multi-area SPB fabric 600 includes four areas 601a-d. Area 601d includes boundary nodes 603a and 605a shared with area 601a, boundary nodes 603b and 605b shared with area 601b, and boundary nodes 603c and 605c shared with area 601c. Area 601d also includes interior nodes 607d and 609d.

According to some aspects, an area ID (e.g., an ISIS area ID) can be a value including a number of bytes defined by the ISIS protocol. In a non-limiting example, the number of bytes for the area ID can be between 1 and 13 bytes. In some examples, the area ID can be included in one or more ISIS hello packet Type-Length-Values (TLVs) and can be "read" by a receiving boundary node for each of the boundary node's ISIS instance. In this example, the boundary node incorporate the area ID as the configuration for the boundary node. The boundary node, using for example the ISIS protocol, can form adjacencies in multiple ISIS areas. According to some examples, the automatic configuration of boundary nodes includes applying dynamically learned area (DLA) to multi-area SPB boundary nodes. In these examples, DLA in the context of multi-area SPB fabric can determine an area ID for each separate ISIS instance/area learned from, for example, ISIS hello packet area TLVs from various ISIS neighbor nodes that have links with the boundary node.

As illustrated in FIG. 6, area 601d has an area ID of 0001, area 601b has an area ID of 0002, and area 601c has an area ID of 0003. It is noted that these area IDs are provided as an example, and areas 601b-d can have other area IDs. In this example, boundary node 603b can receive the area ID 0001 of area 601d and the area ID 0002 area 601b, and automatically configure itself (boundary node 603b) with the area IDs for the areas that it (boundary node 603b) connects to. In some examples, boundary node 603b can receive the area IDs from one or more hello packet TLVs from each of areas 601d and 601b. Additionally, or alternatively, boundary node 603b can receive the area ID of each area to which boundary node 603b is connected to using other types of packets/frames from one or more adjacent nodes in the corresponding area.

Similarly, as illustrated in FIG. 6, boundary node 603c can receive the area ID 0001 of area 601d and the area ID 0003 of area 601c, and automatically configure itself (boundary node 603c) with the area IDs of the areas that it (boundary node 603c) connects to. In some examples, boundary node 603c can receive the area IDs from one or more hello packet TLVs from each of areas 601d and 601c. Additionally, or alternatively, boundary node 603c can receive the area ID of each area to which boundary node 603c is connected to using other types of packets/frames from one or more adjacent nodes in the corresponding area.

Learning area IDs (e.g., ISIS area IDs) from multiple adjacent areas allow for configuration and the operation of boundary nodes, which in turn allows for operation of the multi-area fabric without requiring user intervention, according to some aspects. As discussed above, learning the area ID can include reading the area ID that is included in one or more ISIS hello packet TLVs. Learned area IDs (or in some examples, configured area IDs) can also be used to configure virtual nodes (e.g., generate nick-names, system- IDs, and the like for virtual nodes) representing the corresponding areas, according to some aspects.

In some exemplary aspects, although each boundary node can automatically configure itself to add area IDs, it is noted that one or more of the area IDs for any of the areas connected to the boundary node can be over-ridden by a user-provided configuration. In a non-limiting example, a user (such as a network administrator) can change one or more area IDs at the boundary node.

Additionally, or alternatively, multi-area fabric 600 can automatically configure one or more virtual nodes (e.g., one or more of virtual nodes 615a, 615b, or 615c). In some aspects, the automatic configuration of the virtual node(s) includes configuring the virtual node(s) without user intervention. In some examples, automatic configuration of a virtual node can include automatically determining one or more of a nick-name, a system ID, or a chassis Media Access Control (MAC) for the virtual node.

In some examples, the nick-name (e.g., a SPB nick-name) can be a 4-nibble (20 bit) value used for generating service (I-SID) specific MAC addresses as defined by the SPB protocol. However, aspects of this disclosure are not limited to these examples, and the nick-name can include other values.

According to some aspects, the boundary nodes (and/or the virtual nodes) are configured to use the learned area IDs (and/or configured area IDs) to generate (e.g., derive) the nicknames, system IDs, and chassis MAC for the virtual nodes.

According to some aspects, the nick-name for the virtual node can be derived from the area ID of the area represented by the virtual node. For example, as illustrated in FIG. 6, one or more of boundary nodes 603b and 605b connected to areas 601d and 601b receive the same area ID of the area represented by virtual node 615b (e.g., area ID 0002 from area 601b). In this example, one or more of boundary nodes 603b and 605b (or virtual node 615b) are configured to generate an identical nick-name (and/or system-ID) for the same virtual node 615b, having synchronized configuration without user intervention. In one example, one or more of boundary nodes 603b and 605b (or virtual node 615b itself) can take a number of bits from the area ID and determine the nick-name for virtual node 615b. In a non-limiting example, one or more of boundary nodes 603b and 605b (or virtual node 615b itself) can take the 20 least significant bits from the area ID and determine the nick-name for virtual node 615b. In some examples, if area ID is less than 20 bits, one or more of boundary nodes 603b and 605b (or virtual node 615b itself) use padding with zeros to generate the nick-name. Below are some non-limiting examples:

Area ID 49.0001 will provide nick-name 9.00.01. In this example, the boundary node and/or the virtual node can take the 20 least significant bits from the area ID 49.0001 to determine the nick-name 9.00.01.

Area ID 49.abcd.0002 will provide nick-name d.00.02. In this example, the boundary node and/or the virtual node can take the 20 least significant bits from the area ID 49.abcd.0002 to determine the nick-name d.00.02.

Area ID 01 will provide nick-name 0.00.01. In this example, area ID 01 is less than 20 bits. The boundary node and/or the virtual node can use padding with zeros to generate the nick-name 0.00.01.

It is noted that the method of determining the nick-name for the virtual nodes discussed above are provided as non-limiting examples, and the boundary node(s) and/or virtual node(s) can use other methods to determine the nick-name for the virtual nodes based on the area ID. Also, in some examples, the nick-name automatically generated for the virtual node can be over-ridden by user provided configuration.

According to some aspects, the system ID for the virtual node can be derived from the nick-name determined for the virtual node. For example, as illustrated in FIG. 6, one or more of boundary nodes 603b and 605b connected to areas 601d and 601b (or virtual node 615b representing area 601b) are configured to generate an identical system-ID for the same virtual node 615b, having synchronized configuration without user intervention. In one example, one or more of boundary nodes 603b and 605b (or virtual node 615b itself) use the generated nick-name for virtual node 615b to generate (e.g., derive) the system ID for virtual node 615b. In some examples, the system ID (e.g., an ISIS system ID) can be in a MAC address format. In a non-limiting example, the system ID can be a 48 bit value (e.g., a MAC address format). However, the aspects of this disclosure are not limited to these examples, and the system ID can have other formats. In some examples, one or more boundary nodes and/or virtual nodes can use the nick-name determined for the virtual node to determine the system ID by setting, for example, the second nibble of the system ID to value "2" and filling the least significant bits with a pre-defined value. Below are some non-limiting examples:

Nick-name 9.00.01 will provide system-ID 9200.01FF.FFF0. In this example, the boundary node and/or the virtual node can use the nick-name 9.00.01 to determine the system ID 9200.01FF.FFF0 by for example, copying the first nibble and the second and third bytes from the nick-name value, setting the second nibble of the system ID to value "2", and setting the least significant three bytes to hex values 0xFF, 0xFF, and 0xF0.

Nick-name D.00.02 will provide system-ID D200.02FF.FFF0. In this example, the boundary node and/or the virtual node can use the nick-name d.00.01 to determine the system ID D200.02FF.FFF0 by, for example, copying the first nibble and the second and third bytes from the nick-name value, setting the second nibble of the system ID to value "2", and setting the least significant three bytes to hex values 0xFF, 0xFF, and 0xF0.

Nick-name 0.00.01 will provide system-ID 0200.01FF.FFF0. In this example, the boundary node and/or the virtual node can use the nick-name d0.00.01 to determine the system ID 0200.01FF.FFF0 by, for example, copying the first nibble and the second and third bytes from the nick-name value, setting the second nibble of the system ID to value "2", and setting the least significant three bytes to hex values 0xFF, 0xFF, and 0xF0.

It is noted that the method of determining the system ID for the virtual nodes discussed above is provided as a non-limiting example, and the boundary node(s) and/or virtual node(s) can use other methods to determine the system ID for the virtual nodes based on the nickname of the virtual node and/or area ID. For example, determining the system ID can include setting other nibble(s) of the MAC address format to other values and filling other bits with other pre-defined values. Also, in some examples, the system ID automatically generated for the virtual node can be over-ridden by user provided configuration.

As noted above, boundary nodes connected to the same areas (e.g., boundary nodes 603b and 605b connected to area 601b and 601d) will derive the same nick-name and system-ID values for the virtual node (e.g., virtual node 615b) representing the same area (e.g., area 601b), ensuring consistency and correct operation.

Figure 7:
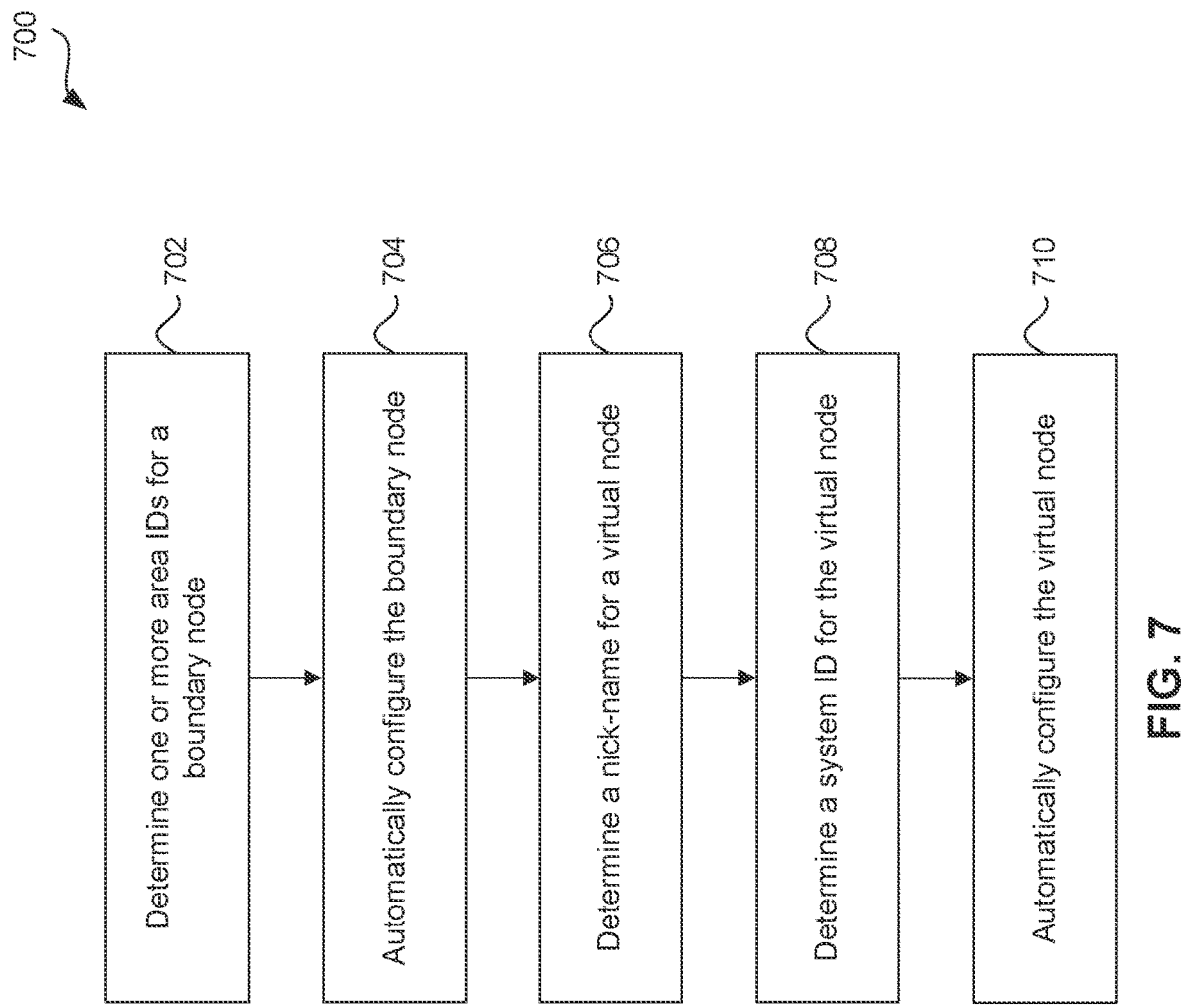
FIG. 7 is a flowchart illustrating example operations for implementing a method for automatically configuring a boundary node and/or a virtual node in a multi-area fabric (e.g., a multi-area SPB fabric), according to some aspects of the disclosure.

FIG. 7 illustrates an example method 700 for automatically configuring a boundary node and/or a virtual node in a multi-area fabric (e.g., a multi-area SPB fabric), according to some aspects of the disclosure. As a convenience and not a limitation, FIG. 7 may be described with regard to elements of FIG. 6. Method 700 may represent the operation of a system (e.g., a boundary node such as boundary node 603b of FIG. 6 and/or a virtual node such as virtual node 615b of FIG. 6) for automatically configuring a boundary node and/or a virtual node in a multi-area fabric. Method 700 may also be performed by computer system 1200 of FIG. 12. Method 700 is not limited to the specific embodiments depicted in those figures, and other systems may be used to perform the method as will be understood by those skilled in the art. It is to be appreciated that not all operations may be needed, and the operations may not be performed in the same order as shown in FIG. 7.

At 702, one or more area IDs are determined for a boundary node. For example, a boundary node (e.g., boundary node 603b of FIG. 6) determines one or more area IDs associated with one or more areas that the boundary node connects to. For example, boundary node 603b of FIG. 6 receives an area ID of area 601d and an area ID of area 601b, and automatically configures itself (boundary node 603b) with the area IDs for the areas that it (boundary node 603b) connects to. In some examples, the boundary node can receive the area IDs from one or more hello packet TLVs from each of the areas it connects to. Additionally, or alternatively, the boundary node can receive the area ID of each area to which boundary node is connected to using other types of packets/frames from one or more adjacent node in the corresponding area.

At 704, the boundary node is automatically configured. According to some examples, the automatic configuration of boundary node includes applying DLA to the boundary node. In some examples, the DLA in the context of multi-area SPB fabric can use determined area IDs for each separate ISIS instance/area learned from, for example, ISIS hello packet TLVs from various ISIS neighbor nodes that have links with the boundary node.

At 706, a nick-name for a virtual node is determined. For example, the configured boundary node (and/or the virtual node) can use at least the one or more area IDs to determine a nick-name for a virtual node generated by the boundary node. For example, the nick-name for the virtual node can be determined (e.g., derived) from the determined area ID of the area represented by the virtual node. For example, as illustrated in FIG. 6, one or more of boundary nodes 603b and 605b connected to areas 601d and 601b receive the same area ID of the area represented by virtual node 615b (e.g., area ID from area 601b). In this example, one or more of boundary nodes 603b and 605b (or virtual node 615b) are configured to generate an identical nick-name for the same virtual node 615b.

At 708, a system ID for the virtual node is determined. For example, the configured boundary node (and/or the virtual node) can determine (e.g., derive) the system ID for the virtual node based on the nick-name determined for the virtual node. For example, as illustrated in FIG. 6, one or more of boundary nodes 603b and 605b connected to areas 601d and 601b (or virtual node 615b representing area 601b) are configured to generate an identical system-ID for the same virtual node 615b. In one example, one or more of boundary nodes 603b and 605b (or virtual node 615b itself) use the generated nick-name for virtual node 615b at 706 to generate (e.g., derive) the system ID for virtual node 615b.

At 710, the virtual node is automatically configured based on the determined nick-name and system ID. In some examples, configuring the virtual node can include assigning the determined nick-name and system ID to the virtual node. In some examples, configuring the virtual node can include assigning the one or more boundary nodes (that established the virtual node) to the virtual node. Additionally, or alternatively, configuring the virtual node can include preparing the virtual node to start its operations.

Some aspects of this disclosure relate to systems and methods for multiple SPB boundary nodes and discovery. As discussed above with respect to virtual nodes, one or more boundary nodes in a multi-area fabric (e.g., a multi-area SPB fabric) can be configured to generate (e.g., produce) one or more virtual nodes. For example, as illustrated in FIG. 5, boundary nodes 503a and 505a are configured to generate virtual node 515a that represents area 501a in area 501d. Similarly, boundary nodes 503b and 505b are configured to generate virtual node 515b that represents area 501b in area 501d. Also, boundary nodes 503c and 505c are configured to generate virtual node 515c that represents area 501c in area 501d. It is noted that although two boundary nodes are illustrated and discussed to generate a virtual node, other number of boundary nodes (e.g., one, three, four, five, etc.) can connect two or more areas and can be configured to generate the virtual nodes. Also, although one virtual node is discussed to be generated by boundary nodes representing each area, the aspects of this disclosure can generate a plurality of virtual nodes representing one area.

According to some aspects of this disclosure, among the boundary nodes between areas, one of the boundary nodes is a designated node that generates the virtual node. The other boundary node(s) are backup nodes, which take over (e.g., represent) the virtual node if the designated node has a failure. In a non-limiting example, boundary node 503a can be considered the designated node that generate virtual node 515a and boundary node 505a can be considered the backup node that can take over (e.g., represent) boundary node 503a if boundary node 503a fails. Some aspects of this disclosure are directed to systems and methods for determining the boundary nodes between areas and which boundary node is the designated node.

In some examples, when the nodes are configured as boundary nodes, their designation as backup nodes or designated nodes can also be configured. For example, when the boundary nodes are automatically configured as discussed above with respect to FIGS. 6 and 7, the boundary nodes can be configured as a designated boundary node or backup boundary node(s). Additionally, or alternatively, when a virtual node is generated and/or is configured, the boundary nodes that generate the virtual node can be configured as a designated boundary node or backup boundary node(s). For example, when the virtual node is automatically configured as discussed above with respect to FIGS. 6 and 7, the boundary nodes generating the virtual node can be configured as a designated boundary node or backup boundary node(s).

In these examples, a boundary node can use part of a packet it transmits to other nodes to indicate that the boundary node is a boundary node and whether the boundary node is a designated boundary node or a backup boundary node. For example, the boundary node can use a header of an LSP (e.g., use one or more bits in the header of the LSP) to indicate that the boundary node is a boundary node and whether the boundary node is a designated boundary node or a backup boundary node.

In some examples, the boundary nodes of the multi-area fabric can be configured as a designated boundary node or backup boundary node(s) by a user (e.g., an administrator) of the multi-area fabric. In other words, the user can design the boundary node to be the designated boundary node or the backup boundary node(s). Additionally, or alternatively, the user can change the configuration of the boundary node from the designated boundary node or the backup boundary node(s), or vice versa.

In addition to, or in alternative to, using the configuration methods discussed above, some aspects of this disclosure can use TLVs for determining the boundary nodes between areas and which boundary node is the designated node. According to some aspects, TLV is used by the multi-area fabric(s) of this disclosure to carry information in LSPs. In some examples, the LSPs can include Link State Protocol Data Units (PDUs). Each PDU can include a header, where the header can include a fixed part and a variable part. In some examples, the variable part of the header of the PDU can include the TLV. Although some examples are discussed with respect to PDUs, the aspects of this disclosure can be applied to other types of packets and/or frames for LSPs. TLV can provide a flexible way to add new header information to the PDU without modifying the fixed part of the header. TLV includes a type field (T), a length field (L) and a value field (V). In a non-limiting example, type (T) can be one octet, length (L) can be one octet, and value (V) can be a plurality of octets. However, the aspects of this disclosure are not limited to these examples and TLV can include other number of octets. In some examples, type field (T) can indicate the type of items in the value field (V). The length field (L) can indicate the length of the value field (V). The value field (V) is the data portion of the packet.

Figure 8:
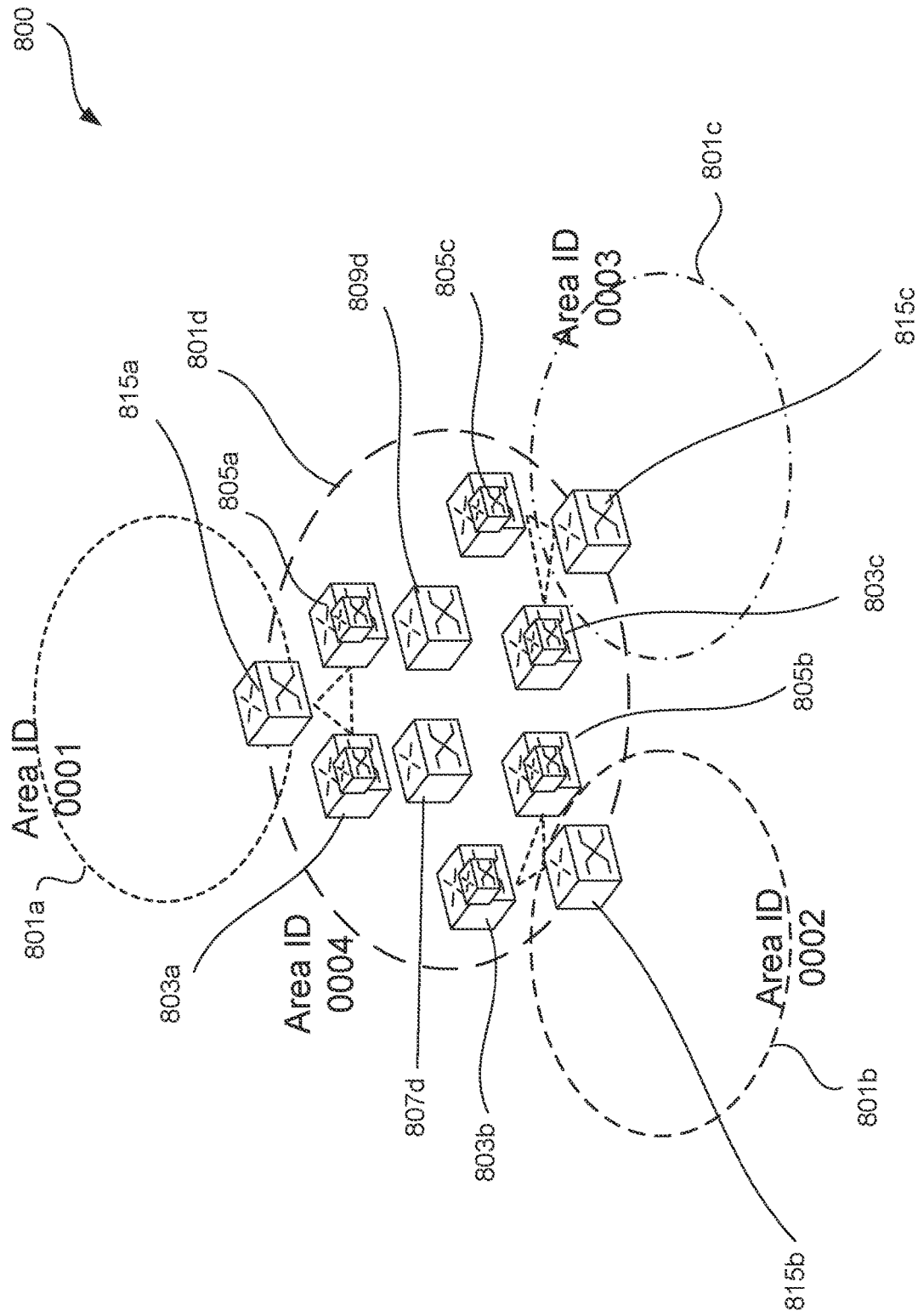
FIG. 8 illustrates an exemplary multi-area SPB fabric for determining the boundary nodes between areas and determining which boundary node is the designated node, according to some aspects of the disclosure.

According to some examples, TLV 1 (e.g., ISIS area TLV 1) is a TLV that includes an area ID (e.g., an ISIS area ID such as ISIS area address). For example, as illustrated in FIG. 8, TLV 1 can be used for determining the boundary nodes between areas and which boundary node is the designated node. FIG. 8 illustrates an exemplary multi-area SPB fabric for determining the boundary nodes between areas and determining which boundary node is the designated node, according to some aspects of the disclosure. In this example, multi-area SPB fabric 800 includes four areas 801*a*-801*d*. Area 801*d* includes boundary nodes 803*a* and 805*a* shared with area 801*a*, boundary nodes 803*b* and 805*b* shared with area 801*b*, and boundary nodes 803*c* and 805*c* shared with area 801*c*. Area 801*d* also includes interior nodes 807*d* and 809*d*.

As illustrated in FIG. 8, area 801*a* has an area ID of 0001, area 801*b* has an area ID of 0002, area 801*c* has an area ID of 0003, and area 801*d* has area ID 0004. It is noted that these area IDs are provided as an example, and areas 801*b*-801*d* can have other area IDs.

According to some aspects, each area of areas 801*a*-801*d* has its corresponding ISIS instance. In some examples, the ISIS instance of each area 801*a*-801*d* runs independently from the instance of the other areas. The TLV (e.g., the TLV 1) associated with each area includes the area ID associated to that area. For example, the TLV (e.g., the TLV 1) associated with area 801*a* includes area ID 0001. The TLV (e.g., the TLV 1) associated with area 801*b* includes area ID 0002. The TLV (e.g., the TLV 1) associated with area 801*c* includes area ID 0003. And the TLV (e.g., the TLV 1) associated with area 801*d* includes area ID 0004.

According to some aspects of this disclosure, a boundary node can be shared by two or more areas. For example, boundary nodes 803*a* and 805*a* are shared by areas 801*a* and 801*d*. The boundary node can have a plurality of ISIS instances, each instance associated with an area that the boundary node connects to. For example, boundary node 803*a* can have a first ISIS instance associated with area 801*a* and a second ISIS instance associated with area 801*d*. In this example, the TLV (e.g., the TLV 1) associated with a boundary node can include a plurality of area IDs, where each one of the area IDs is associated with a respective ISIS instance associated with the area that shares the boundary node. For example, a TLV (e.g., a TLV 1) associated with boundary node 803*a* can include a first area ID 0001 associated with area 801*a* (and its ISIS instance) and a second area ID 0004 associated with area 801*d* (and its ISIS instance).

In this example, nodes can determine (e.g., detect and/or discover) boundary nodes by receiving and examining the TLVs (e.g., TLV 1*s*). For example, when boundary node 803*a* receives a PDU from boundary node 805*a*, boundary node 803*a* can examine the TLV included in the received PDU. For example, boundary node 803*a* can determine that the received TLV includes, for example, two area IDs. Based on the determined area IDs, boundary node 803*a* can determine that boundary node 805*a* (from which the PDU was received) is a boundary node. Therefore, boundary node 803*a* can automatically discover boundary node 805*a*. In some examples, boundary node 803*a* can also determine the areas (e.g., areas 801*a* and 801*d*) that share boundary node 805*a*.

According to some examples, boundary node 803*a* can compare its area IDs with the determined area IDs in the TLV received from boundary node 805*a*. Based on this comparison, boundary node 803*a* can determine that both boundary nodes 803*a* and 805*a* are being shared with same areas in multi-area fabric 800.

Although this example is discussed with respect to boundary node 803*a* automatically discovering boundary node 805*a*, similar methods can be applied for any node (e.g., an interior node, a boundary node, etc.) to discover boundary node 805*a*. In some examples, automatic discovery of the nodes helps in ease of configuration burden on an end user. Additionally, or alternatively, automatic discovery of the nodes can prevent error in configuring multiple nodes to form a collective cluster connecting multiple areas.

In addition to, or in alternative to, automatically discovering boundary nodes, some aspects of this disclosure are directed to selecting and/or determining a boundary node as a designated boundary node. For example, when two or more boundary nodes 803*a* and 805*a* are used to generate virtual node 815*a*, some aspects of this disclosure can be used to elect, for example, boundary node 803*a* as the designated boundary node and elect boundary node 805*a* as a backup node. In some examples, other nodes (e.g., interior nodes, other boundary nodes, etc.) can be configured to determine this designation based on one or more parameters received from boundary nodes 803*a* and 805*a*. In some examples, system IDs can be used to determine which boundary node is the designated boundary node and which boundary node is the backup. In a non-limiting example, a boundary node with a lowest system ID can be considered the designated boundary node. In another non-limiting example, a boundary node with a highest system ID can be considered the designated boundary node. However, the aspects of this disclosure are not limited to these examples and the nodes can determine the designation of boundary nodes using other methods.

According to some examples, each node (e.g., interior nodes, other boundary nodes, etc.) in multi-area fabric 800 can have a unique system ID. When boundary node 803a receives a packet (e.g., a PDU) from boundary node 805a, boundary node 803a can determine a system ID associated with boundary node 805a from, for example, the received PDU. Boundary node 803a can compare the system ID of boundary node 805a with the system ID of boundary node 803a. Based on the comparison, boundary node 803a can determine which one of the boundary nodes 803a and 805a is the designated boundary node and which one is the backup boundary node.

Figure 9:
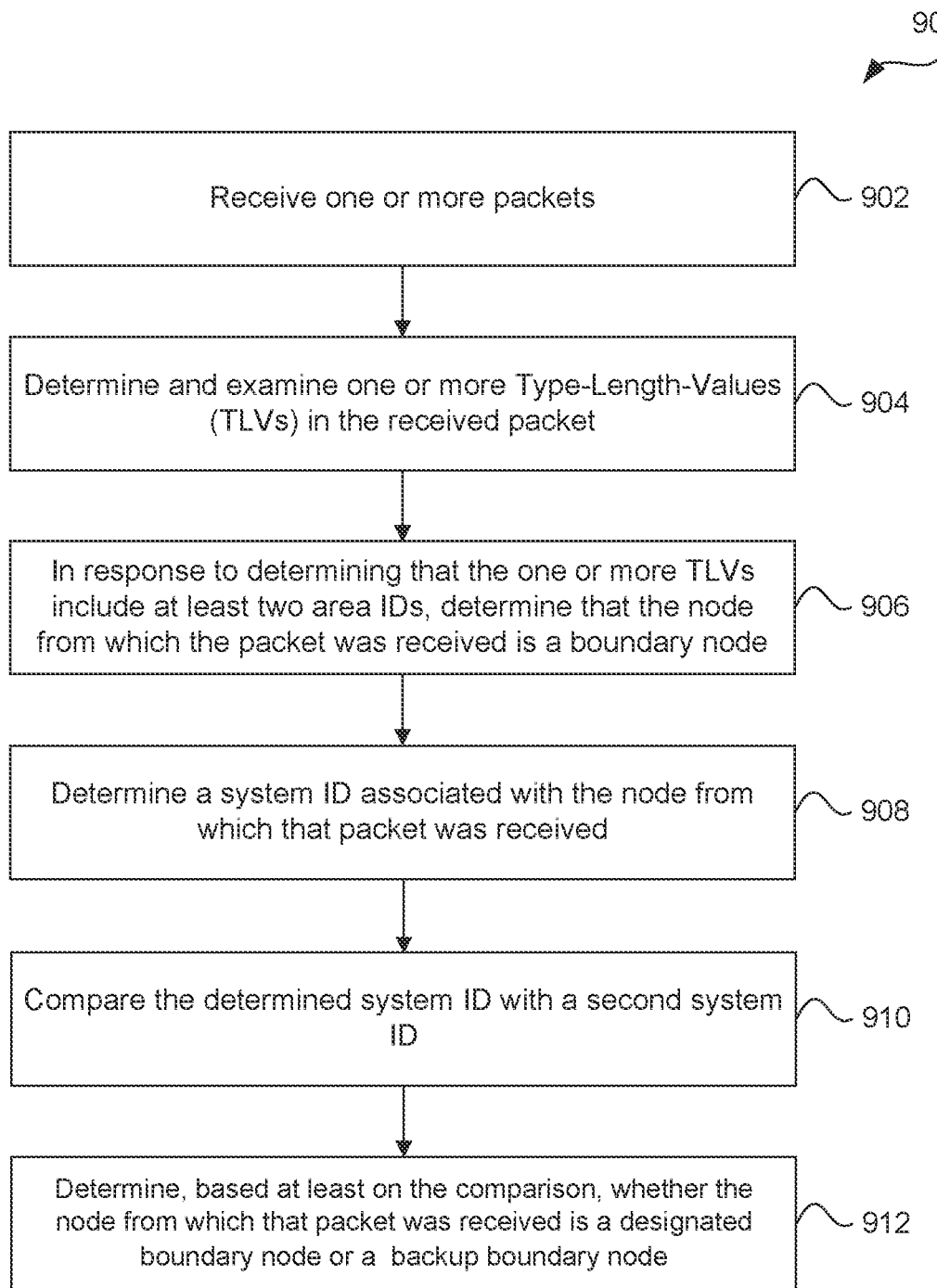
FIG. 9 is a flowchart illustrating example operations for implementing a method for automatically determining the boundary nodes between areas and determining which boundary node is the designated node, according to some aspects of the disclosure.

FIG. 9 illustrates an example method 900 for automatically determining the boundary nodes between areas and determining which boundary node is the designated node, according to some aspects of the disclosure. As a convenience and not a limitation, FIG. 9 may be described with regard to elements of FIG. 8. Method 900 may represent the operation of a system (e.g., a boundary node such as boundary node 803b of FIG. 8 and/or a virtual node such as virtual node 815b of FIG. 8) for automatically determining the boundary nodes between areas and determining which boundary node is the designated node. Method 900 may also be performed by computer system 1200 of FIG. 12. Method 900 is not limited to the specific embodiments depicted in those figures, and other systems may be used to perform the method as will be understood by those skilled in the art. It is to be appreciated that not all operations may be needed, and the operations may not be performed in the same order as shown in FIG. 9.

At 902, one or more packets such as, but not limited to, one or more LSPs are received. For example, a network node (e.g., boundary node 803b of FIG. 8) receives a packet from another network node (e.g., boundary node 805b). In some examples, the packet (e.g., the LSP) can include one or more Link State PDUs.

At 904, one or more TLVs in the received packet are determined and examined. For example, boundary node 803b can determine and examine one or more TLVs in the packet received from boundary node 805b. For example, when boundary node 803b receives a PDU from boundary node 805b, boundary node 803b can examine the TLV included in the received PDU. Boundary node 803b can determine the number of area IDs in the TLV. For example, boundary node 803b can determine whether the TLV includes one area ID, two area IDs, three area IDs, or other number of area IDs.

At 906, in response to determining that the one or more TLVs include at least two area IDs, it is determined that the node from which the packet was received is a boundary node. For example, boundary node 803b determines that the received TLV includes, for example, two area IDs. Based on the determined area IDs, boundary node 803a can determine that the node (e.g., boundary node 805a) from which the packet was received is a boundary node. Therefore, boundary node 803b can automatically discover boundary node 805b. In some examples, boundary node 803b can also determine the areas (e.g., areas 801b and 801d) that share boundary node 805b.

Additionally, or alternatively, method 900 can include boundary node 803b comparing its area IDs with the determined area IDs in the TLV received from boundary node 805b. Based on this comparison, boundary node 803b can determine that both boundary nodes 803b and 805b are being shared with the same areas in multi-area fabric 800.

At 908, a system ID associated with the node from which that packet was received is determined. For example, boundary node 803b can determine the system ID associated with the node (e.g., boundary node 805b) from which that packet was received.

At 910, the determined system ID is compared with a second system ID. For example, boundary node 803b can compare the determined system ID (determine the system ID associated with the node (e.g., boundary node 805b) from which that packet was received) with the system ID of boundary node 803b.

At 912, based at least on the comparison, it is determined whether the node from which that packet was received is a designated boundary node or a backup boundary node. In a non-limiting example, a boundary node with a lowest system ID can be considered the designated boundary node. In this example, boundary node 803b can determine that boundary node 805b is a designated boundary node if the system ID of boundary node 805b is lower (e.g., less) than the system ID of boundary node 803b. For example, if the system ID of boundary node 803b is D200.0100.0086 and the system ID of boundary node 805b is B200.0100.0086, boundary node 803b can determine that boundary node 805b is the designated boundary node. In this example, boundary node 803b can determine that boundary node 803b is a backup boundary node. Alternatively, boundary node 803b can determine that boundary node 803b is a designated boundary node if the system ID of boundary node 803b is lower (e.g., less) than the system ID of boundary node 805b. In this example, boundary node 803b can determine that boundary node 805b is a backup boundary node.

In another non-limiting example, a boundary node with a highest system ID can be considered the designated boundary node. However, the aspects of this disclosure are not limited to these examples and the nodes can determine the designation of boundary nodes using other methods.

Although these examples are provided with respect to two boundary nodes, the aspects of this disclosure can be applied to any number of boundary nodes. A node (e.g., a boundary node) can automatically determine and discover a plurality of boundary nodes using the aspects of this disclosure. Additionally, the node (e.g., a boundary node) can automatically determine and discover which node is a designated boundary node using the aspects of this disclosure.

Some aspects of this disclosure relate to systems and methods for loop prevention in a multi-area fabric (e.g., a multi-area SPB fabric). Although some examples are discussed with respect to a multi-area SPB fabric, the aspect of this disclosure can be applied to any multi-area domain.

In a flexible backbone free topology, two or more areas can be connected in any fashion to each other. However, the inter-connection of the areas should not create a loop. As discussed in more detail below, some aspects of this disclosure are directed to systems and methods to detect whether a loop is to be created between two more areas when the areas are to be connected. Additionally, or alternatively, some aspects of this disclosure can prevent and/or break the loop at the inter-connect point before the areas are joined together. In some examples, preventing and/or breaking the loop can include preventing one or more nodes that could be boundary node(s) at the inter-connect point from functioning as the boundary nodes. Additionally, or alternatively, preventing and/or breaking the loop can include preventing one or more nodes that could be boundary node(s) at the inter-connect point from creating a virtual node.

Figure 10:
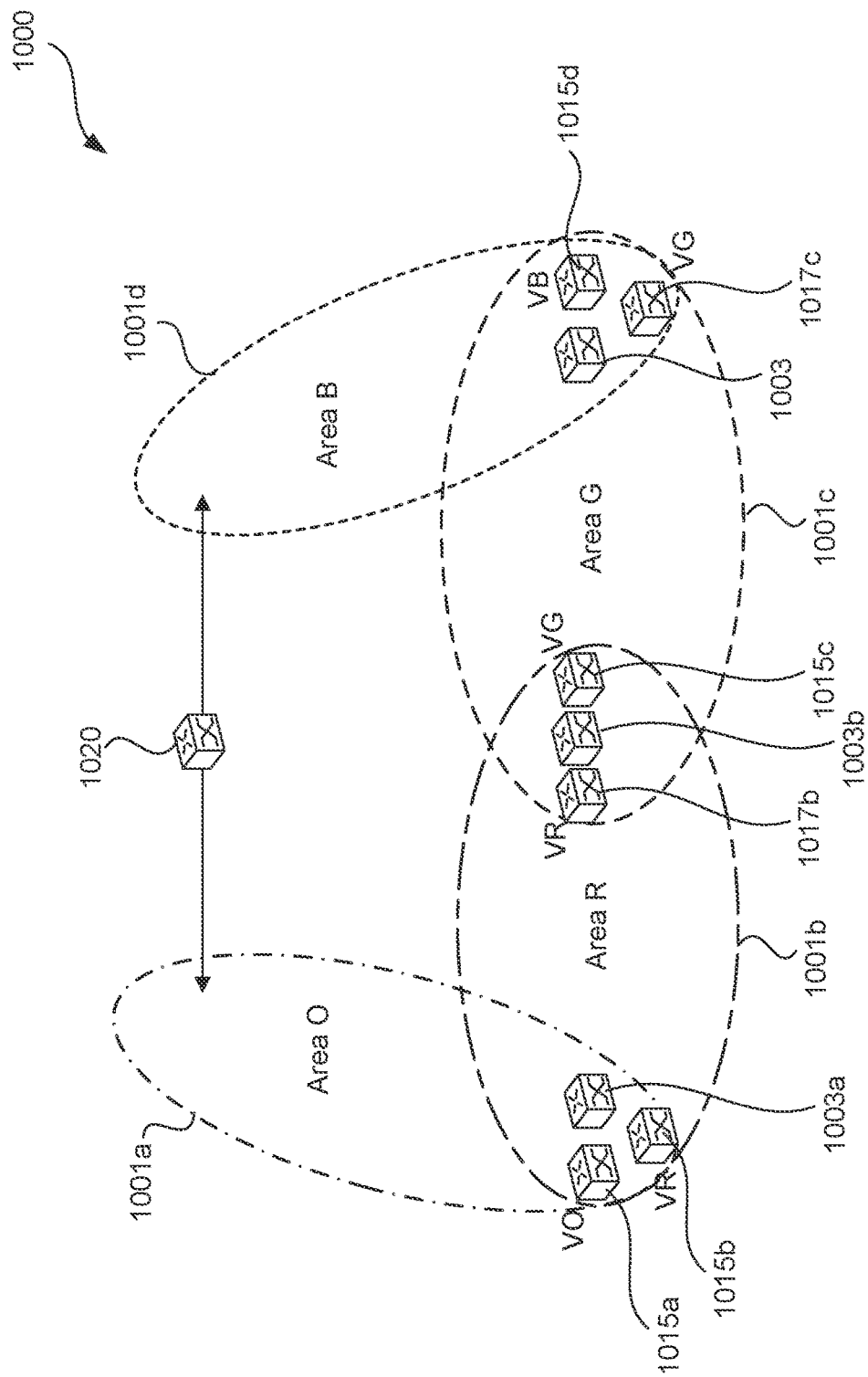
FIG. 10 illustrates an exemplary multi-area SPB fabric for detecting and/or preventing a loop, according to some aspects of the disclosure.

FIG. 10 illustrates an exemplary multi-area SPB fabric for detecting and/or preventing a loop, according to some aspects of the disclosure. In this example, multi-area SPB fabric 1000 includes four areas 1001a-1001d. In this example, areas 1001*a* and 1001*b* are connected to each other and share boundary node 1003*a*. Although one boundary node 1003*a* is illustrated in FIG. 10, areas 1001*a* and 1001*b* can share more than one boundary node. In this example, two virtual nodes 1015*a* and 1015*b* are generated (e.g., created) by boundary node 1003*a* (and/or any additional boundary nodes). In this example, virtual node 1015*a* is configured to represent area 1001*a* (and/or any additional areas beyond area 1001*a*) in area 1001*b*. Virtual node 1015*b* can be configured to represent area 1001*b* (and/or any additional areas beyond area 1001*b*, for example, areas 1001*c* and 1001*d*) in area 1001*a*.

Areas 1001*b* and 1001*c* are connected to each other and share boundary node 1003*b*. Although one boundary node 1003*b* is illustrated in FIG. 10, areas 1001*b* and 1001*c* can share more than one boundary node. In this example, two virtual nodes 1017*b* and 1015*c* are generated (e.g., created) by boundary node 1003*b* (and/or any additional boundary nodes). In this example, virtual node 1017*b* is configured to represent area 1001*b* (and/or any additional areas beyond area 1001*b*, for example, area 1001*a*) in area 1001*c*. Virtual node 1015*c* can be configured to represent area 1001*c* (and/or any additional areas beyond area 1001*c*, for example, area 1001*d*) in area 1001*b*.

Areas 1001*c* and 1001*d* are connected to each other and share boundary node 1003*c*. Although one boundary node 1003*c* is illustrated in FIG. 10, areas 1001*c* and 1001*d* can share more than one boundary node. In this example, two virtual nodes 1017*c* and 1015*d* are generated (e.g., created) by boundary node 1003*c* (and/or any additional boundary nodes). In this example, virtual node 1017*c* is configured to represent area 1001*c* (and/or any additional areas beyond area 1001*c*, for example, areas 1001*a* and 100*b*) in area 1001*d*. Virtual node 1015*d* can be configured to represent area 1001*d* (and/or any additional areas beyond area 1001*c*) in area 1001*c*.

As illustrated in FIG. 10, if areas 1001*a* and 1001*d* are to be connected using, for example, node 1020, a loop would be created. In some aspects, node 1020 is configured to detect whether a loop is to be created between areas 1001*a* and 1001*d* when areas 1001*a* and 1001*d* are to be connected. Additionally, or alternatively, node 1020 (and/or multi-area fabric 1000) is configured to prevent and/or break the loop at the inter-connect point before areas 1001*a* and 1001*d* are joined together.

According to some aspects, a topology TLV can be used by node 1020 and/or multi-area fabric 1000 to detect whether a loop is to be created between areas 1001*a* and 1001*d* when areas 1001*a* and 1001*d* are to be connected. In some examples, one or more virtual nodes of multi-area fabric 1000 can include their corresponding topology TLV(s). The topology TLV is included in the virtual node that lists the areas behind it and their neighbor areas, according to some aspects of this disclosure. For example, a topology TLV of a virtual node can include a format including one or more of an area ID of the area that the virtual node represents, one or more neighbor area IDs of the area that are neighbors (e.g., immediate neighbors) of the area that the virtual node represents, and one or more metrics for each one of one or more neighbor area IDs. In some examples, one or more metrics for a neighbor area can be optional and can include parameters for reaching that neighbor area. In some examples, the one or more metrics can include an integer indicating the cost of crossing that area. For example, a higher value of the integer can indicate a higher cost, in terms of hops, delay, etc. in crossing that area. The one or more metrics can include other parameters.

In a non-limiting example, a topology TLV of a virtual node can have the following format: Area <ID>, Neighbor < Area ID> (for Area <ID>), Metric (for Neighbor < Area ID>). However, this disclosure is not limited to this example and the aspects of this disclosure can have other topology TLV formats.

For example, virtual node 1015*a* can include a topology TLV that includes an area ID of area 1001*a*, a neighbor area ID of area 1001*b* (neighbor area to area 1001*a*), and one or more metrics for each neighbor area ID.

For example, virtual node 1015*b* can have three topology TLVs. A first topology TLV includes an area ID of area 1001*b*, a neighbor area ID of area 1001*a*, a neighbor area ID of area 1001*c* (neighbor areas to area 1001*b*), and one or more metrics for each neighbor area ID. A second topology TLV includes an area ID of area 1001*c*, a neighbor area ID of area 1001*b*, a neighbor area ID of area 1001*d* (neighbor areas to area 1001*c*), and one or more metrics for each neighbor area ID. A third topology TLV includes an area ID of area 1001*d*, a neighbor area ID of area 1001*c* (neighbor areas to area 1001*d*), and one or more metrics for each neighbor area ID. In some examples, the three topology TLVs of virtual node 1015*b* can be included in one combined topology TLV.

For example, virtual node 1017*b* can have two topology TLVs. A first topology TLV includes an area ID of area 1001*b*, a neighbor area ID of area 1001*a*, a neighbor area ID of area 1001*c* (neighbor areas to area 1001*b*), and one or more metrics for each neighbor area ID. A second topology TLV includes an area ID of area 1001*a*, a neighbor area ID of area 1001*b* (neighbor areas to area 1001*a*), and one or more metrics for each neighbor area ID. In some examples, the two topology TLVs of virtual node 1017*b* can be included in one combined topology TLV.

For example, virtual node 1015*c* can have two topology TLVs. A first topology TLV includes an area ID of area 1001*c*, a neighbor area ID of area 1001*b*, a neighbor area ID of area 1001*d* (neighbor areas to area 1001*c*), and one or more metrics for each neighbor area ID. A second topology TLV includes an area ID of area 1001*d*, a neighbor area ID of area 1001*c* (neighbor areas to area 1001*d*), and one or more metrics for each neighbor area ID. In some examples, the two topology TLVs of virtual node 1015*c* can be included in one combined topology TLV.

For example, virtual node 1017*c* can have three topology TLVs. A first topology TLV includes an area ID of area 1001*c*, a neighbor area ID of area 1001*b*, a neighbor area ID of area 1001*d* (neighbor areas to area 1001*c*), and one or more metrics for each neighbor area ID. A second topology TLV includes an area ID of area 1001*b*, a neighbor area ID of area 1001*a*, a neighbor area ID of area 1001*c* (neighbor areas to area 1001*b*), and one or more metrics for each neighbor area ID. A third topology TLV includes an area ID of area 1001*a*, a neighbor area ID of area 1001*b* (neighbor areas to area 1001*a*), and one or more metrics for each neighbor area ID. In some examples, the three topology TLVs of virtual node 1017*c* can be included in one combined topology TLV.

For example, virtual node 1015*d* can include a topology TLV that includes an area ID of area 1001*d*, a neighbor area ID of area 1001*c* (neighbor area to area 1001*d*), and one or more metrics for each neighbor area ID.

According to some aspects, node 1020 and/or multi-area fabric 1000 can use one or more topology TLVs to detect whether a loop is to be created between areas 1001*a* and 1001*d* when areas 1001*a* and 1001*d* are to be connected. For example, when node 1020 is used to connect areas 1001*a* and 1001d, node 1020 can examine one or more topology TLVs for one or more virtual nodes of areas 1001a and 1001d to detect whether a loop is to be created between areas 1001a and 1001d. In some examples, node 1020 can examine one or more topology TLVs of virtual node 1015b and/or one or more TLVs of virtual node 1017c. For example, by examining one or more topology TLVs of virtual node 1015b, node 1020 can determine that area 1001a is connected to area 1001b, which is connected to area 1001c, which in turn in connected to area 1001d. Additionally, or alternatively, by examining one or more topology TLVs of virtual node 1015d, node 1020 can determine that that area 1001d is connected to area 1001c, which is connected to area 1001b, which in turn in connected to area 1001a.

Therefore, node 1020 can determine that connecting areas 1001a and 1001d using node 1020 can create a loop. In addition to, or in alternative to, detecting the loop, node 1020 can prevent and/or break the loop. In one example, to prevent and/or break the loop, node 1020 that could be a boundary node at the inter-connect of areas 1001a and 100d will not function as a boundary node. Additionally, or alternatively, to prevent and/or break the loop, node 1020 can become a boundary node at the inter-connect of areas 1001a and 100d but will not generate (e.g., create) a virtual node. In this example, node 1020 can continue to participate in both areas 1001a and 1001d, and hence has visibility to the LSDB of both areas, but does not create a virtual node.

Figure 11:
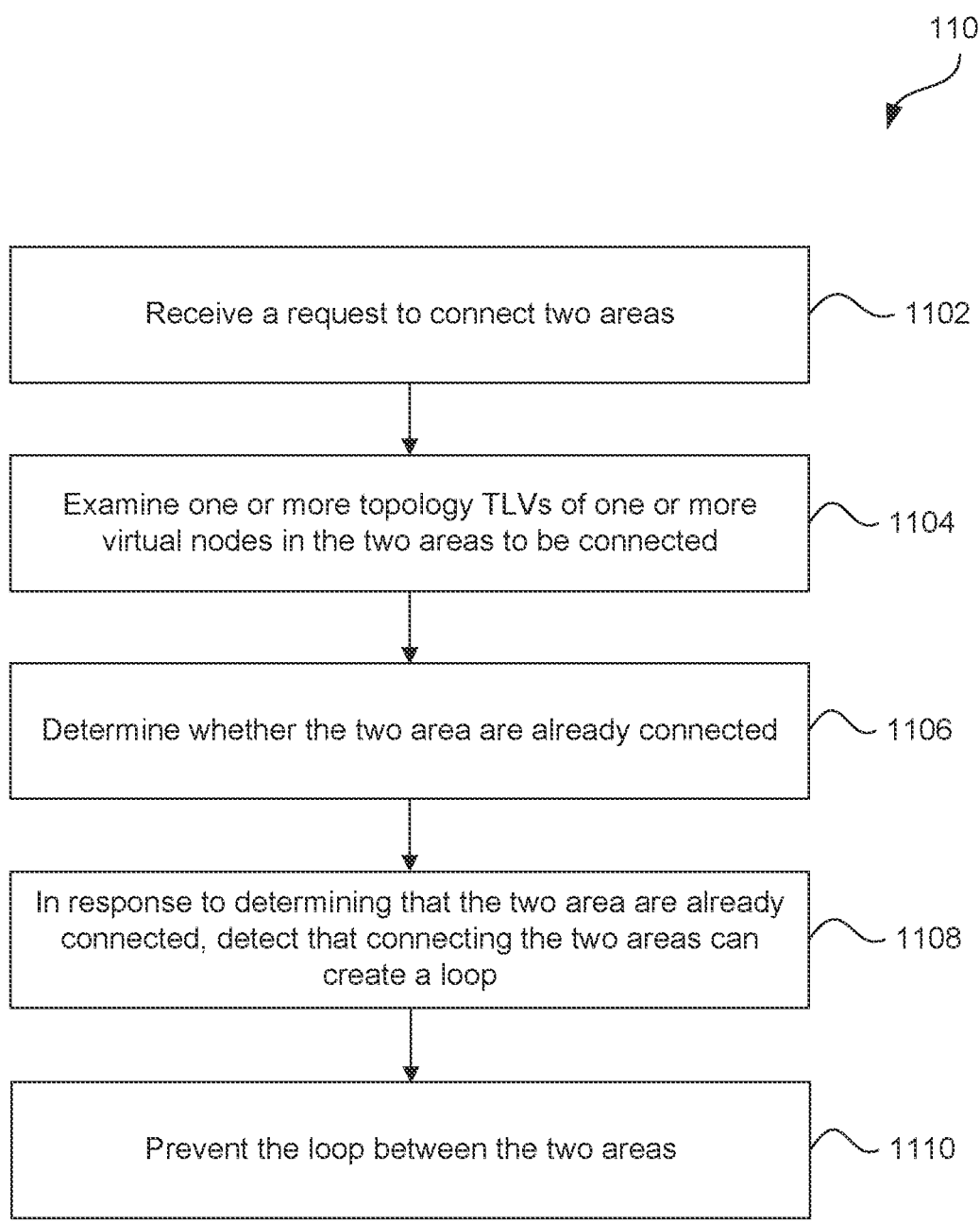
FIG. 11 is a flowchart illustrating example operations for implementing a method for detecting and/or preventing a loop in a multi-area fabric, according to some aspects of the disclosure

FIG. 11 illustrates an example method 1100 for detecting and/or preventing a loop in a multi-area fabric, according to some aspects of the disclosure. As a convenience and not a limitation, FIG. 11 may be described with regard to elements of FIG. 10. Method 1100 may represent the operation of a system (e.g., a network node such as node 1020 of FIG. 10) for detecting and/or preventing a loop. Method 1100 may also be performed by computer system 1200 of FIG. 12. Method 1100 is not limited to the specific embodiments depicted in those figures, and other systems may be used to perform the method as will be understood by those skilled in the art. It is to be appreciated that not all operations may be needed, and the operations may not be performed in the same order as shown in FIG. 11.

At 1102, a request is received to connect two areas. For example, node 1020 receives a request to connect areas 1001a and 1001d of FIG. 10. Although some examples are discussed with respect to two areas, the aspects of this disclosure are not limited to two areas and can be applied to methods and systems for detecting and/or preventing loops when two or more areas are to be connected. In some examples, node 1020 receives the request to connect areas 1001a and 1001d when node 1020 is configured (e.g., automatically and/or by a user) as a boundary node as discussed herein. For example, node 1020 receives a request to configure itself as a boundary node. Additionally, or alternatively, receiving the request to connect areas 1001a and 1001d can include detecting one or more conditions/features at node 1020 to configure itself as a boundary node. In some examples, these conditions/features can include methods discussed above with respect to FIGS. 6 and 7.

At 1104, one or more topology TLVs of one or more virtual nodes in the two areas to be connected are examined. For example, node 1020 examines one or more topology TLVs of virtual node 1015b. Additionally, or alternatively, node 1020 examines one or more topology TLVs of virtual node 1017c. In some examples, node 1020 can examine topology TLVs of all virtual nodes in the areas to be connected.

At 1106, it is determined whether the two area are already connected. For example, based at least on the examination of the one or more topology TLVs of one or more virtual nodes in the two areas, node 1020 can determine whether the two areas are already connected. In a non-limiting example, and as illustrated in FIG. 10, determining whether the two areas are already connected can include determining that area 1001a is connected to area 1001b, determining that area 1001b is connected to area 1001c, and determining that area 1001c is connected to area 1001d. In some examples, two or more areas are connected when these areas share one or more boundary nodes.

At 1108, in response to determining that the two area are already connected, detect that connecting the two areas can create a loop. For example, node 1020, based at least on the determination that areas 1001a and 1001d are already connected (e.g., through areas 1001b and 1001c), detects that connecting areas 1001a and 1001d at node 1020 can create a loop.

At 1110, the loop between the two areas is prevented. For example, node 1020 can prevent (and/or break) creating a loop between areas 1001a and 1001d. In one example, node 1020 that could be a boundary node at the inter-connect of areas 1001a and 100d will not function as a boundary node. Additionally, or alternatively, node 1020 can become a boundary node at the inter-connect of areas 1001a and 100d but will not generate (e.g., create) a virtual node. In this example, node 1020 can continue to participate in both areas 1001a and 1001d, and hence has visibility to the LSDB of both areas, but does not create a virtual node.

Figure 12:
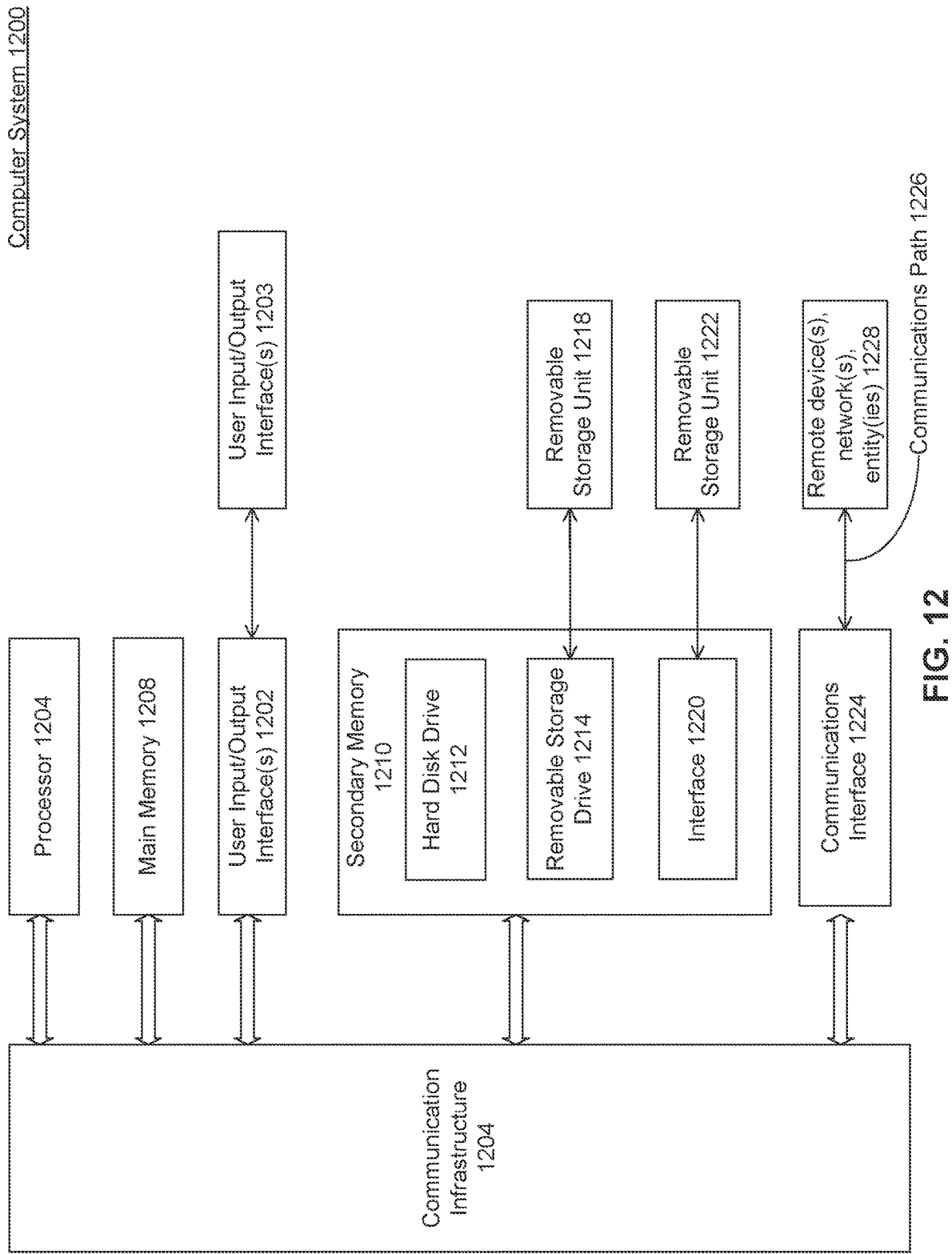
FIG. 12 is an example computer system useful for implementing various embodiments.

Various embodiments may be implemented, for example, using one or more well-known computer systems, such as computer system 1200 shown in FIG. 12. One or more computer systems 1200 may be used, for example, to implement any aspect of the disclosure discussed herein, as well as combinations and sub-combinations thereof.

Computer system 1200 may include one or more processors (also called central processing units, or CPUs), such as a processor 1204. Processor 1204 may be connected to a communication infrastructure or bus 1206.

Computer system 1200 may also include customer input/output device(s) 1203, such as monitors, keyboards, pointing devices, etc., which may communicate with communication infrastructure 1206 through customer input/output interface(s) 1202.

One or more of processors 1204 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 may also include a main or primary memory 1208, such as random access memory (RAM). Main memory 1208 may include one or more levels of cache. Main memory 1208 may have stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 may include a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 may read from and/or write to removable storage unit 1218.

Secondary memory 1210 may include other means, devices, components, instrumentalities or other approaches for allowing computer programs and/or other instructions and/or data to be accessed by computer system 1200. Such means, devices, components, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 may enable computer system 1200 to communicate and interact with any combination of external devices, external networks, external entities, etc. (individually and collectively referenced by reference number 1228). For example, communication interface 1224 may allow computer system 1200 to communicate with external or remote devices 1228 over communications path 1226, which may be wired and/or wireless (or a combination thereof), and which may include any combination of LANs, WANs, the Internet, etc. Control logic and/or data may be transmitted to and from computer system 1200 via communication path 1226.

Computer system 1200 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1200 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1200 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture including a tangible, non-transitory computer useable or readable medium having control logic (software) stored thereon may also be referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
receiving, by a network node, a request to connect a first area of a multi-area fabric to a second area of the multi-area fabric;
examining, by the network node, two or more topological Type-Length-Values (TLVs) associated with a virtual node of the first area, wherein the two or more TLVs associated with the virtual node of the first area comprise a first area identifier (ID) and a second area ID;
determining, by the network node and based at least on the examining the two or more topological TLVs, that the first area and the second area are connected, wherein the determining comprises determining that the first area ID is a neighbor area identifier (ID) of the first area and determining that the second area ID is an area ID of the second area; and
in response to determining that the first area and the second area are connected, preventing, by the network node, a loop between the first area and the second area.

2. The method of claim 1, further comprising:
examining, by the network node, two or more second topological TLVs associated with a second virtual node of the second area; and
determining, by the network node and based at least on the examining the one or more topological TLVs and the two or more second topological TLVs, whether the first area and the second area are connected.

3. The method of claim 1, wherein the preventing the loop between the first area and the second area comprises preventing the network node from generating a second virtual node.

4. The method of claim 1, wherein the receiving the request to connect the first area and the second area comprises detecting, by the network node, one or more conditions to configure the network node as a boundary node.

5. The method of claim 1, wherein the two or more topological TLVs associated with the virtual node of the first area comprises an area ID of a third area, and wherein the virtual node is configured to represent the third area in the first area.

6. The method of claim 5, wherein the two or more topological TLVs associated with the virtual node of the first area further comprises a neighbor area ID of a fourth area that is a neighbor of the third area.

7. The method of claim 6, wherein the determining whether the first area and the second area are connected comprises:
determining that the first area is connected to the third area;
determining that the third area is connected to the fourth area; and
determining that the fourth area is connected to the second area.

8. The method of claim 7, wherein the first area is connected to the third area by sharing a boundary node.

9. A tangible computer-readable device having instructions stored thereon that, when executed by a network node, causes the network node to perform operations comprising:
receiving a request to connect a first area of a multi-area fabric to a second area of the multi-area fabric;
examining two or more topological Type-Length-Values (TLVs) associated with a virtual node of the first area, wherein the two or more TLVs associated with the virtual node of the first area comprise a first area identifier (ID) and a second area ID;
determining, based at least on the examining the two or more topological TLVs, that the first area and the second area are connected, wherein the determining comprises determining that the first area ID is a neighbor area identifier (ID) of the first area and determining that the second area ID is an area ID of the second area; and
in response to determining that the first area and the second area are connected, preventing a loop between the first area and the second area.

10. The computer-readable device of claim 9, the operations further comprising:
examining two or more second topological TLVs associated with a second virtual node of the second area; and
determining, based at least on the examining the one or more topological TLVs and the two or more second topological TLVs, whether the first area and the second area are connected.

11. The computer-readable device of claim 9, wherein the preventing the loop between the first area and the second area comprises preventing the network node from generating a second virtual node.

12. The computer-readable device of claim 9, wherein the receiving the request to connect the first area and the second area comprises detecting one or more conditions to configure the network node as a boundary node.

13. The computer-readable device of claim 9, wherein the two or more topological TLVs associated with the virtual node of the first area comprises an area ID of a third area, and wherein the virtual node is configured to represent the third area in the first area.

14. The computer-readable device of claim 13, wherein the two or more topological TLVs associated with the virtual node of the first area further comprises a neighbor area ID of a fourth area that is a neighbor of the third area.

15. The computer-readable device of claim 14, wherein the determining whether the first area and the second area are connected comprises:
determining that the first area is connected to the third area;
determining that the third area is connected to the fourth area; and
determining that the fourth area is connected to the second area.

16. A network node, comprising:
a processor; and
a memory configured to store computer executable instructions that when executed by the processor causes the processor to:
receive a request to connect a first area of a multi-area fabric to a second area of the multi-area fabric;
examine two or more topological Type-Length-Values (TLVs) associated with a virtual node of the first area, wherein the two or more TLVs associated with the virtual node of the first area comprise a first area identifier (ID) and a second area ID;

determine, based at least on the examining the two or more topological TLVs, that the first area and the second area are connected, wherein the determining comprises determining that the first area ID is a neighbor area identifier (ID) of the first area and determining that the second area ID is an area ID of the second area; and in response to determining that the first area and the second area are connected, prevent a loop between the first area and the second area.

17. The network node of claim 16, wherein the processor is further configured to:

examine two or more second topological TLVs associated with a second virtual node of the second area; and determine, based at least on the examining the one or more topological TLVs and the two or more second topological TLVs, whether the first area and the second area are connected.

18. The network node of claim 16, wherein to prevent the loop between the first area and the second area the processor is configured to prevent the network node from generating a second virtual node.

19. The network node of claim 16, wherein to receive the request to connect the first area and the second area the processor is configured to detect one or more conditions to configure the network node as a boundary node.

20. The network node of claim 19, wherein to prevent the loop between the first area and the second area the processor is configured to prevent the network node to function as the boundary node.

* * * * *